(12) United States Patent
Hijikata et al.

(10) Patent No.: US 7,560,826 B2
(45) Date of Patent: Jul. 14, 2009

(54) DRIVER ASSISTING SYSTEM, METHOD FOR ASSISTING DRIVER, AND VEHICLE INCORPORATING SAME

(75) Inventors: Shunsuke Hijikata, Kamakura (JP); Masahiro Egami, Yokosuka (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 144 days.

(21) Appl. No.: 10/990,603

(22) Filed: Nov. 18, 2004

(65) Prior Publication Data
US 2005/0110348 A1 May 26, 2005

(30) Foreign Application Priority Data
Nov. 20, 2003 (JP) ............................ P2003-391124

(51) Int. Cl.
*B60R 21/01* (2006.01)
*B60R 21/013* (2006.01)
*B60R 21/0132* (2006.01)
*B60R 21/0134* (2006.01)

(52) U.S. Cl. ..................................... 307/9.1
(58) Field of Classification Search ................ 307/10.1, 307/9.1
See application file for complete search history.

(56) References Cited

U.S. PATENT DOCUMENTS

| | | | | |
|---|---|---|---|---|
| 6,037,860 A * | 3/2000 | Zander et al. | ............... | 340/436 |
| 6,226,389 B1 * | 5/2001 | Lemelson et al. | ........... | 382/104 |
| 6,226,592 B1 * | 5/2001 | Luckscheiter et al. | ....... | 701/301 |
| 6,559,762 B1 * | 5/2003 | Tarabishy et al. | ........... | 340/435 |
| 6,580,973 B2 * | 6/2003 | Leivian et al. | .................. | 701/1 |
| 6,721,659 B2 * | 4/2004 | Stopczynski | ................ | 701/301 |
| 6,813,562 B2 * | 11/2004 | Altan et al. | ................. | 701/301 |
| 6,934,614 B2 * | 8/2005 | Yamamura et al. | ............ | 701/45 |
| 6,977,630 B1 * | 12/2005 | Donath et al. | .................. | 345/7 |
| 7,009,500 B2 * | 3/2006 | Rao et al. | .................... | 340/435 |
| 7,072,764 B2 * | 7/2006 | Donath et al. | ............... | 701/200 |
| 7,124,010 B2 * | 10/2006 | Egami | ......................... | 701/93 |
| 2003/0060936 A1 * | 3/2003 | Yamamura et al. | ............. | 701/1 |

(Continued)

FOREIGN PATENT DOCUMENTS

JP    05-058238    3/1993

(Continued)

OTHER PUBLICATIONS

Japanese Office Action dated Sep. 24, 2008.

*Primary Examiner*—Stephen W Jackson
*Assistant Examiner*—Adi Amrany
(74) *Attorney, Agent, or Firm*—McDermott Will & Emery LLP

(57) ABSTRACT

A driving assist method and system for assisting a driver operating a vehicle. An obstacle is detected and information of a legal speed restriction on vehicle speeds for a road which the vehicle is traveling on, is obtained. A first type risk perceived by the driver from the detected obstacle is calculated, and a second type of risk is determined by comparing the detected vehicle speed and the legal speed restriction. The calculated first and second type of risk are translated into different first and second forms of tactile stimulus, respectively, and are applied to the driver via a single device to forward the calculated first and second type of risk to the driver. The single device is the driver's seat or the driver controlled device.

36 Claims, 20 Drawing Sheets

U.S. PATENT DOCUMENTS

| | | |
|---|---|---|
| 2003/0163240 A1 | 8/2003 | Egami |
| 2003/0191573 A1* | 10/2003 | Beyer et al. .................. 701/70 |
| 2003/0233902 A1 | 12/2003 | Hijikata |
| 2003/0236608 A1 | 12/2003 | Egami |
| 2004/0122573 A1* | 6/2004 | Mizutani .................... 701/45 |
| 2005/0275520 A1 | 12/2005 | Hijikata |

FOREIGN PATENT DOCUMENTS

| | | | |
|---|---|---|---|
| JP | 06-162396 | | 6/1994 |
| JP | 10-166889 | | 6/1998 |
| JP | 10-166890 | | 6/1998 |
| JP | 2000-54860 | | 2/2000 |
| JP | 2001-199296 | * | 7/2001 |
| JP | 2001-341599 | | 12/2001 |
| JP | 2002-245574 | | 8/2002 |
| JP | 2003-246226 | | 9/2003 |

* cited by examiner

FIG.29
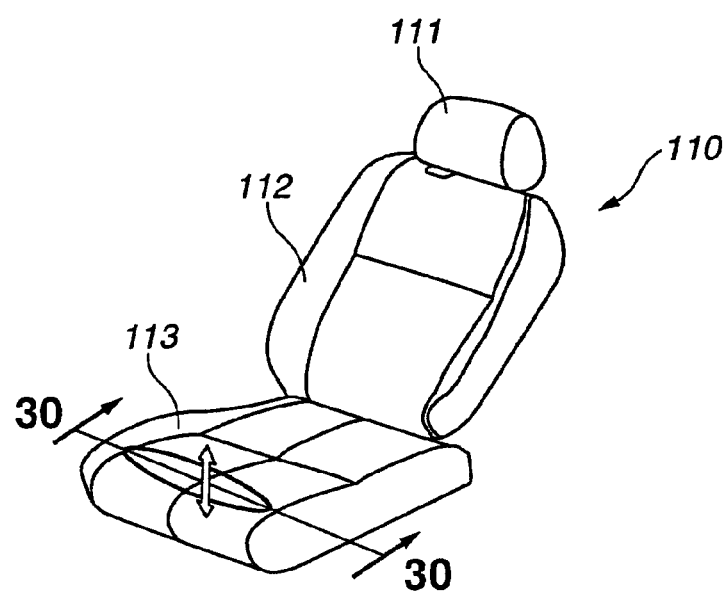
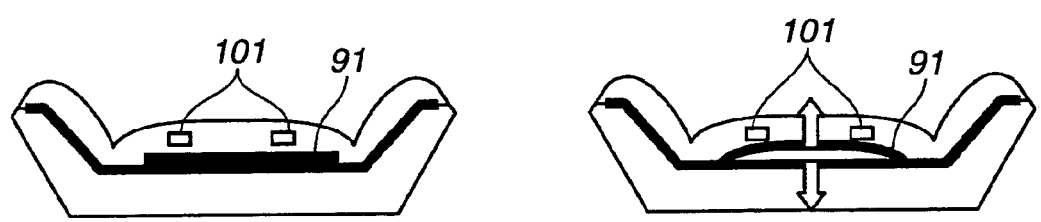
FIG.30          FIG.31

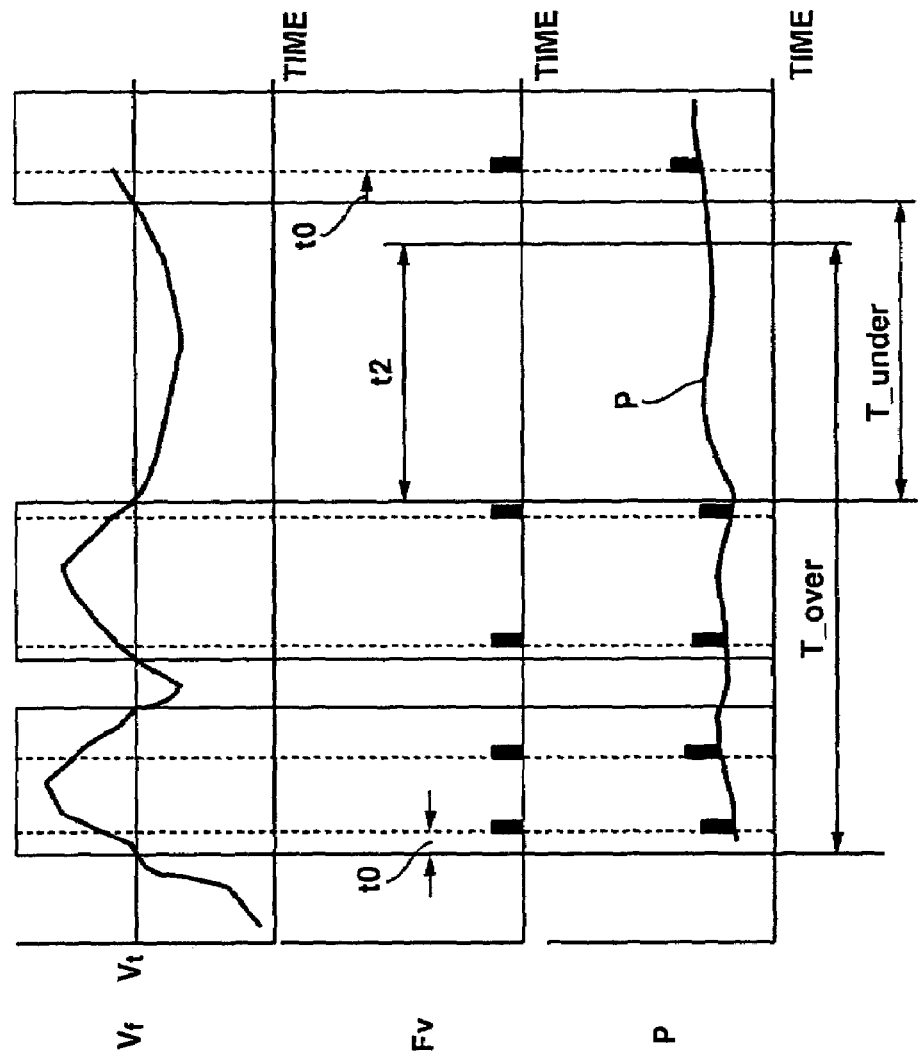

FIG.34 FIG.35
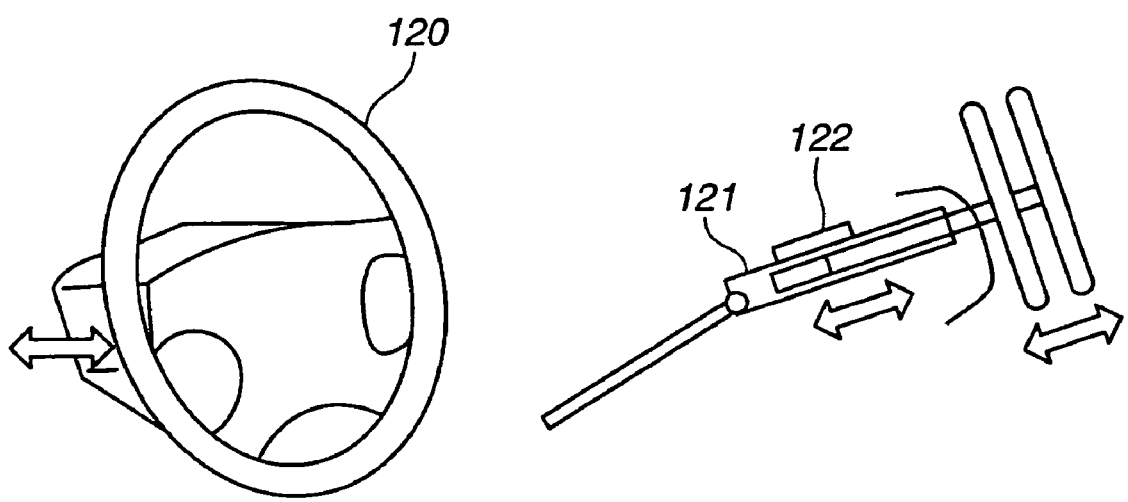

DRIVER ASSISTING SYSTEM, METHOD FOR ASSISTING DRIVER, AND VEHICLE INCORPORATING SAME

FIELD OF THE INVENTION

The present invention relates to a driver assisting system, a method for assisting a driver, and a vehicle incorporating the driver assisting system.

DESCRIPTION OF RELATED ART

JP10-166889A discloses a driver assisting system, which, when a distance to a preceding vehicle drops to a predetermined value, sets an increased magnitude of reaction force of an accelerator pedal. JP10-166890A discloses a similar driver assisting system. JP2000-54860A discloses a driver assisting system, which, when an automatic control is being carried out, sets an increased magnitude of reaction force of an accelerator pedal. US 2003/0163240 A1, published Aug. 28, 2003, discloses a driving assist system which adjusts reaction force of an accelerator pedal upon detection of a discontinuous change in environment around a vehicle.

US 2003/0060936 A1, published Mar. 27, 2003, discloses a driving assist system for assisting effort by an operator (a driver) to operate a vehicle while traveling. This system comprises a data acquisition system acquiring data including information on vehicle state and information on environment in a field around the vehicle, a controller, and at least one actuator. The controller determines a future environment in the field around the vehicle using the acquired data, makes an operator response plan in response to the determined future environment, which plan prompts the operator to operate the vehicle in a desired manner for the determined future environment, and to generates a command. The actuator is coupled to an operator controlled input device to mechanically affect operation of the input device in a manner that prompts the operator in response to the command to operate the vehicle in the desired manner.

There is a need for a system and vehicle to effectively forward not only a risk derived from information on environment in field around a vehicle but also a potential risk, which might become actualized, to the driver.

SUMMARY OF THE INVENTION

According to one aspect of the present invention, there is provided a driver assisting system for assisting a driver, within a driver's seat, operating a driver controlled input device of a vehicle, comprising:

a running environment detecting section detecting a running environment around the vehicle;

a risk calculating section calculating a first risk and a second risk based on the detected running environment:

a tactile stimulus controlling section translating the calculated first risk and second risk into different first and second forms of tactile stimulus, respectively; and a tactile stimulus forwarding device that provides a first force and a second force to one of the driver's seat and the driver controlled input device to stimulate the driver with the different first and second forms of tactile stimulus thereby to forward the first and second risks to the driver, respectively.

According to another aspect of the invention, a vehicle is provided having a plurality of driver contact surfaces, comprising:

a running environment detecting section detecting a running environment around the vehicle;

a risk calculating section calculating a first risk and a second risk based on the detected running environment:

a stimulus controlling section translating the calculated first risk and second risk into different first and second forms of stimulus, respectively; and a risk forwarding device that provides a first force and a second force to at least one of the driver contact surfaces to stimulate the driver with the different first and second forms of stimulus thereby to forward the first and second risks to the driver, respectively.

According to another aspect of the present invention, there is provided a method for assisting a driver, within a driver's seat, operating a driver controlled input device of a vehicle, comprising:

detecting a running environment around the vehicle;

calculating a first risk and a second risk based on the detected running environment:

translating the calculated first risk and second risk into different first and second forms of tactile stimulus, respectively;

providing a first force to one of the driver's seat and input device to stimulate the driver with the first form of tactile stimulus thereby to forward the calculated first risk to the driver; and providing a second force to the one of the driver's seat and input device to stimulate the driver with the second form of tactile stimulus thereby to forward the calculated second risk to the driver.

According to another aspect of the present invention, there is provided a method for assisting a driver, within a driver's seat, operating a driver controlled input device of a vehicle, comprising:

acquiring data including information on vehicle state and information on environment around the vehicle;

calculating a risk perceived (RP) by the driver from the environment using the acquired data, and a potential risk using the acquired data:

translating the calculated risk perceived (RP) and the calculated potential risk into different first and second forms of tactile stimulus, respectively;

providing a first force to one of the driver's seat and the driver controlled input device to stimulate the driver with the first form of tactile stimulus thereby to forward the calculated risk perceived (RP) to the driver; and providing a second force to the one of the driver's seat and the driver controlled input device to stimulate the driver with the second form of tactile stimulus thereby to forward the calculated potential risk to the driver.

A driving assist method and system for assisting a driver operating a vehicle. An obstacle is detected and information of a legal speed restriction on vehicle speeds for a road which the vehicle is traveling on, is obtained. A first type risk perceived by the driver from the detected obstacle is calculated, and a second type of risk is determined by comparing the detected vehicle speed and the legal speed restriction. The calculated first and second type of risk aretranslated into different first and second forms of tactile stimulus, respectively, and are applied to the driver via a single device to forward the calculated first and second type of risk to the driver. The single device is the driver's seat or the driver controlled device.

The foregoing and other features, aspects and advantages of the present invention will become apparent from the fol-

BRIEF DESCRIPTION OF THE DRAWINGS

FIG. 16A illustrates an exemplary varying of a first correction coefficient with different values of the time elapsed from a moment immediately after the vehicle speed has exceeded the vehicle speed standard;

FIG. 29 is a perspective view of a driver's seat;

FIG. 30 is a cross section taken through the line 30-30 in FIG. 29 in an uninflated state;

FIG. 31 is the same cross section in an inflated state;

FIGS. 33(a) to 33(c) are time charts illustrating operation of the fifth exemplary implementation;

FIG. 34 is a perspective view of a driver controlled device in the form of a steering system with a steering wheel;

FIG. 35 is a side view of the steering system:

DETAILED DESCRIPTION OF THE INVENTION

First Exemplary Implementation of the Invention

Referring to the accompanying drawings, various exemplary implementations of a driver assisting system according to the present invention are described. For better understanding of some of the exemplary implementations, reference should be made to the previously-mentioned U.S. 2003/0060936 A1, published Mar. 27, 2003, which has been hereby incorporated by reference in its entirety.

Figure 1:
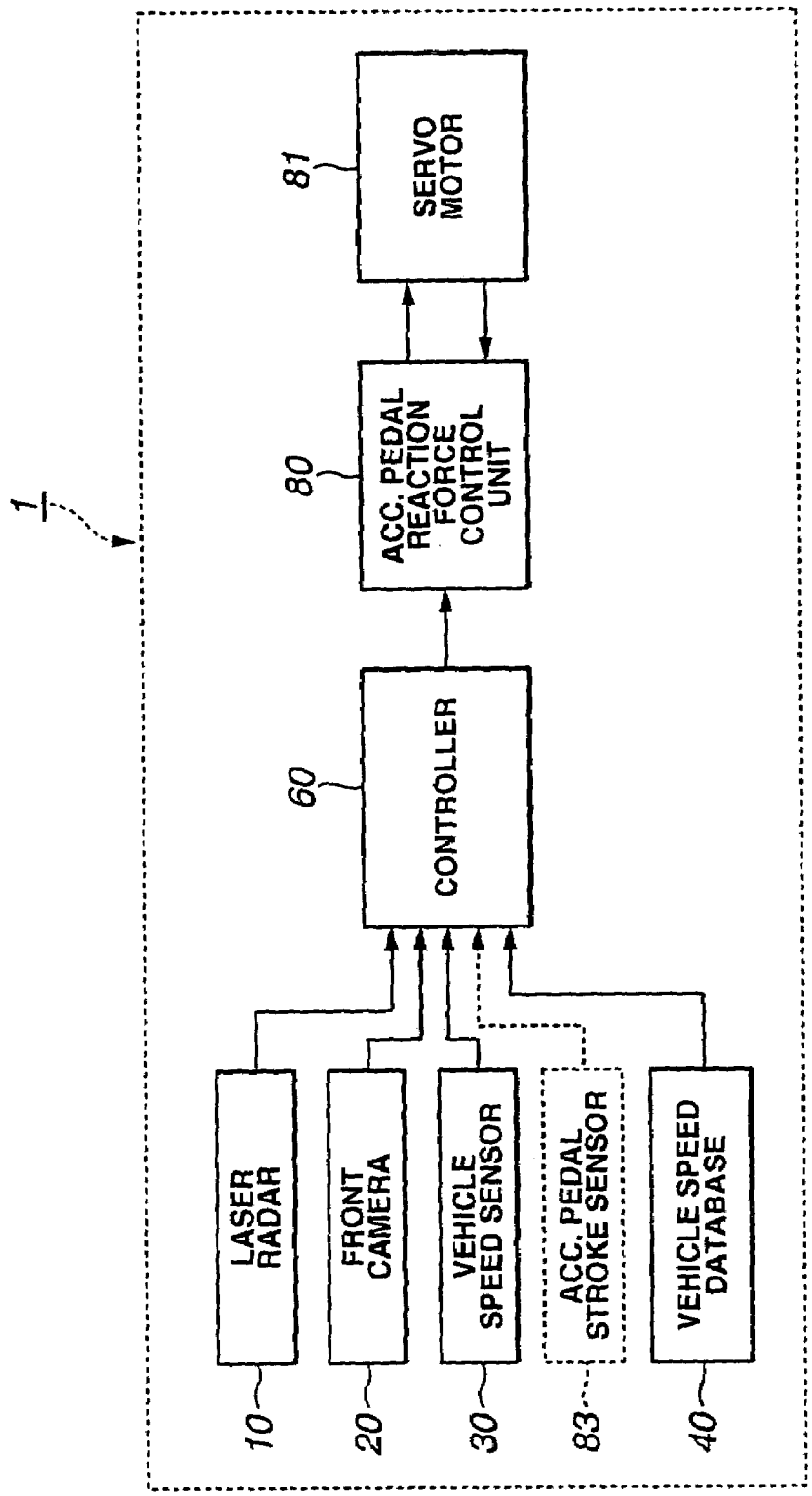
FIG. 1 is a block diagram illustrating hardware of a first exemplary implementation of a driver assisting system according to the present invention.
Figure 2:
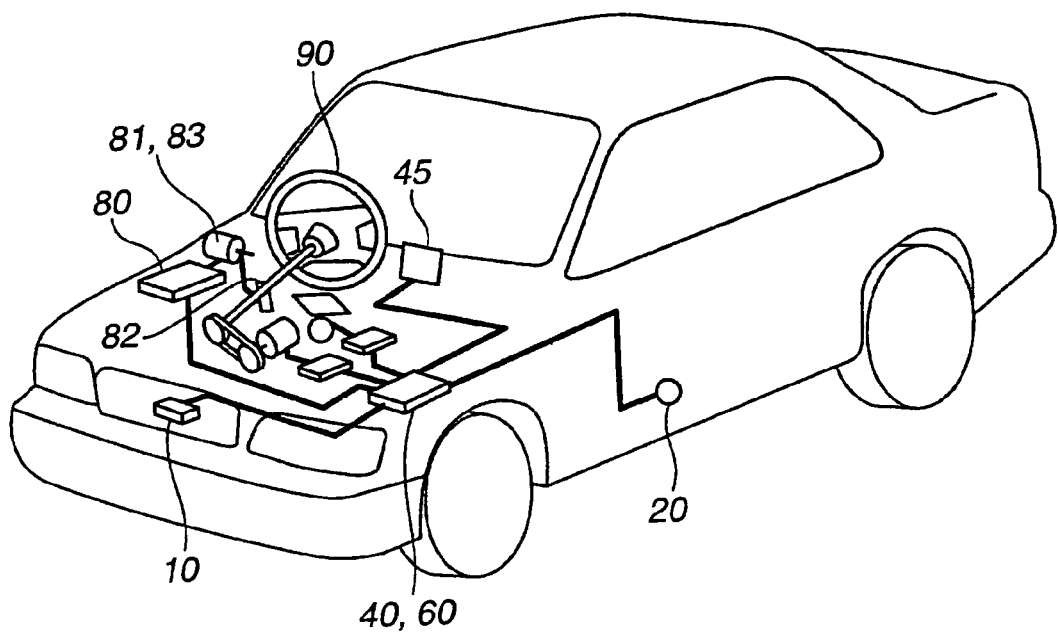
FIG. 2 is a perspective view a vehicle in the form of an automobile incorporating the driver assisting system.

FIG. 1 is a block diagram showing elements of a first exemplary implementation of a driver assisting system 1 according to the present invention. FIG. 2 is a perspective view of an automobile installed with the driver assisting system 1.

The driver assisting system 1 includes a laser radar 10. As shown in FIG. 2, the laser radar 10 is mounted to the vehicle at a front bumper or a front grille thereof. It scans horizontally and laterally about 6 degrees to each side of an axis parallel to the vehicle longitudinal centerline, propagates infrared pulses forwardly and receives the reflected radiation by an obstacle, such as, a rear bumper of a preceding vehicle. The laser radar 10 can provide distances to vehicles in front of the vehicle and angular locations of the preceding vehicles. The laser radar 10 provides an output to a controller 60.

The driver assisting system 1 also includes a front camera 20. The front camera 20 of a CCD or CMOS type is mounted to the vehicle in the vicinity of the internal rear view mirror. It acquires image data of a region in front of the vehicle. The region extends from a camera axis laterally to each side by about 30 degrees. The front camera 20 provides an output to the controller 60.

The driver assisting system 1 also includes a vehicle speed sensor 30. The vehicle speed sensor 30 may determine vehicle speed by processing outputs from wheel speed sensors. The vehicle speed sensor 20 may include an engine controller or a transmission controller, which can provide a signal indicative of the vehicle velocity. The vehicle speed sensor 30 provides an output to the controller 60.

The driver assisting system 1 further includes a vehicle speed database 40. The vehicle speed database 40 contains vehicle upper speed limits incorporated, for example, in a navigation system, not illustrated. The controller 60 retrieves the vehicle speed database 40 using a current position of the vehicle, obtained from the navigation system, to find restriction on traffic speed for the current position of the vehicle. The current position of the vehicle is determined by the navigation system after calculation based on information indicated by a GPS signal.

The controller 60 responsible for information processing within the driver assisting system 1 may contain a microprocessor including a central processing unit (CPU), a read only memory (ROM), and a random access memory (RAM). The controller 60 receives distance information from the laser radar 10 and image information around the vehicle from the front camera 20 to determine running environment around the vehicle and state of obstacles around the vehicle. To determine the state of obstacles around the vehicle, the controller 60 receives the image data from the front camera 20 for image-processing, including filtering and pattern recognition. The state of obstacles around the vehicle includes a distance to a preceding vehicle in front, presence or absence of and degree of any vehicle running in the adjacent next lane, the degree of how much the vehicle has approached the vehicle running in the adjacent next lane, position of the vehicle relative to the lane marker and guard rail (distance and angle to the left and right lane markers and guard rails), and the configuration of the lane markers and the guard rails.

The controller 60 calculates a risk perceived RP by the vehicle driver from each of the obstacles based on the determined state of the obstacles around the vehicle, and regulates reaction force on an accelerator pedal within the vehicle cabin. The controller 60 calculates a vehicle speed standard, which may be set for a road the vehicle is running on. The controller 60 calculates an excess by which the vehicle speed exceeds the vehicle speed standard and provides an output to keep the vehicle driver informed of the calculated excess by subjecting the driver to reaction force pulses (click reaction force) from the accelerator pedal. The vehicle speed standard is herein used to mean a vehicle speed value calculated based on a recommended vehicle speed, which the vehicle is recommended to travel at, taking into account the speed limit for the road, an error of the vehicle speed sensor 30 and fuel economy.

Figure 3:
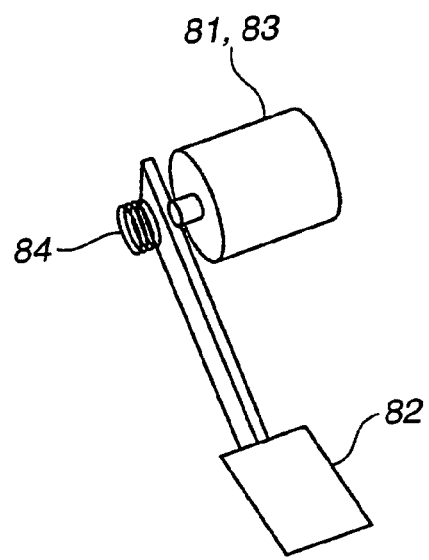
FIG. 3 is a driver controlled device, in the form of an accelerator pedal, of the vehicle.

FIG. 3 shows a driver controlled input device, in the form of an accelerator pedal 82. For understanding the accelerator pedal, reference should be made to U.S. 2003/0236608 A1 (published Dec. 25, 2003) and also to U.S. 2003/0233902 A1 (published Dec. 25, 2003), both of which have been hereby incorporated by reference in their entireties. As shown in FIG. 3, the accelerator pedal 82 has a link mechanism including a servo motor 81 and an accelerator pedal stroke sensor 83. The servo motor 81 can provide torque having varying magnitudes under control of an accelerator pedal reaction force control unit 80. The accelerator pedal reaction force control unit 80 controls the servo motor 81 so that the torque produced by the servo motor 81 varies in magnitude with different values of a command from the controller 60. As the servo motor 81 can provide torque having a desired one of the magnitudes to cause generation of a desired reaction force under the control if the servo motor reaction force control unit 80, it is easy to alter, in a desired manner, the magnitude of manual effort, with which a driver steps on the accelerator pedal 82. As the link mechanism converts a magnitude of manual operation for the accelerator pedal 82 to an angle of rotation of the servo motor 81, the accelerator pedal stroke sensor 83 measures this angle of rotation of the servo motor 81 to detect the magnitude of manual operation for the accelerator pedal 82.

When the above-described reaction force control is not carried out, the accelerator pedal 82 shows an ordinary reaction force characteristic by which the reaction force increases linearly as the accelerator pedal is depressed deeply. This ordinary reaction force characteristic is accomplished by a spring force provided by a torque spring 84 arranged at the center of rotational movement of the accelerator pedal 82.

The following describes operation of this exemplary implementation of driver assisting system 1. The controller 60 recognizes the state of obstacles around the vehicle from a vehicle speed at which the vehicle travels, a relative position between the vehicle and the preceding vehicle in front and/or the preceding vehicle in the next lane (a distance to the preceding vehicle in front and/or a distance to the preceding vehicle in the next lane), a direction of travel of each of the preceding vehicles, and a position of the vehicle relative to lane markers or guard rails. Based on the recognized state of obstacles around the vehicle, the controller 60 calculates risk perceived RP by the driver from each of the obstacles. The controller 60 calculates a control amount by which the magnitude of risk perceived RP by the driver from each of the obstacles may be communicated to the driver. For example, the controller 60 calculates a reaction force control amount by which the reaction force of the accelerator pedal 82 varies.

Based on information of restriction on vehicle speed for a road which the vehicle is traveling on, the controller 60 calculates a vehicle speed standard, which is to be taken into account during driving the vehicle. Based on the calculated vehicle speed standard, the controller 60 sets a train of additional pulses of reaction force, called a click reaction force. The controller 60 adds the click reaction force to the accelerator pedal reaction force control amount for the RP to give an accelerator pedal reaction force instruction value and provides the accelerator pedal reaction force instruction value to the accelerator pedal reaction force control unit 80. The accelerator pedal reaction force control unit 80 carries out accelerator pedal reaction force control in response to the accelerator pedal reaction force instruction value.

Figure 4:
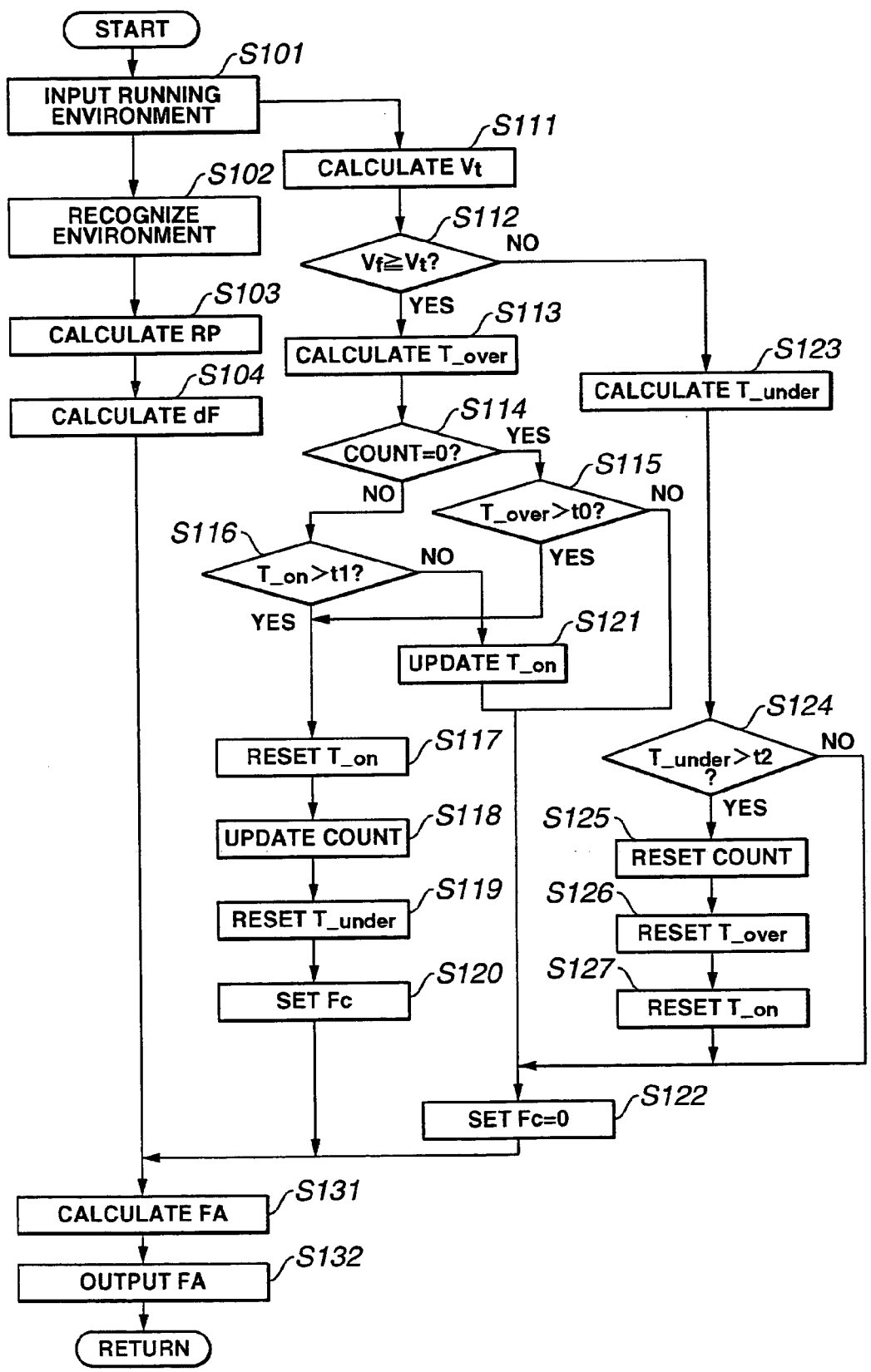
FIG. 4 is a flow chart illustrating operation of the first exemplary implementation.
Figure 5:
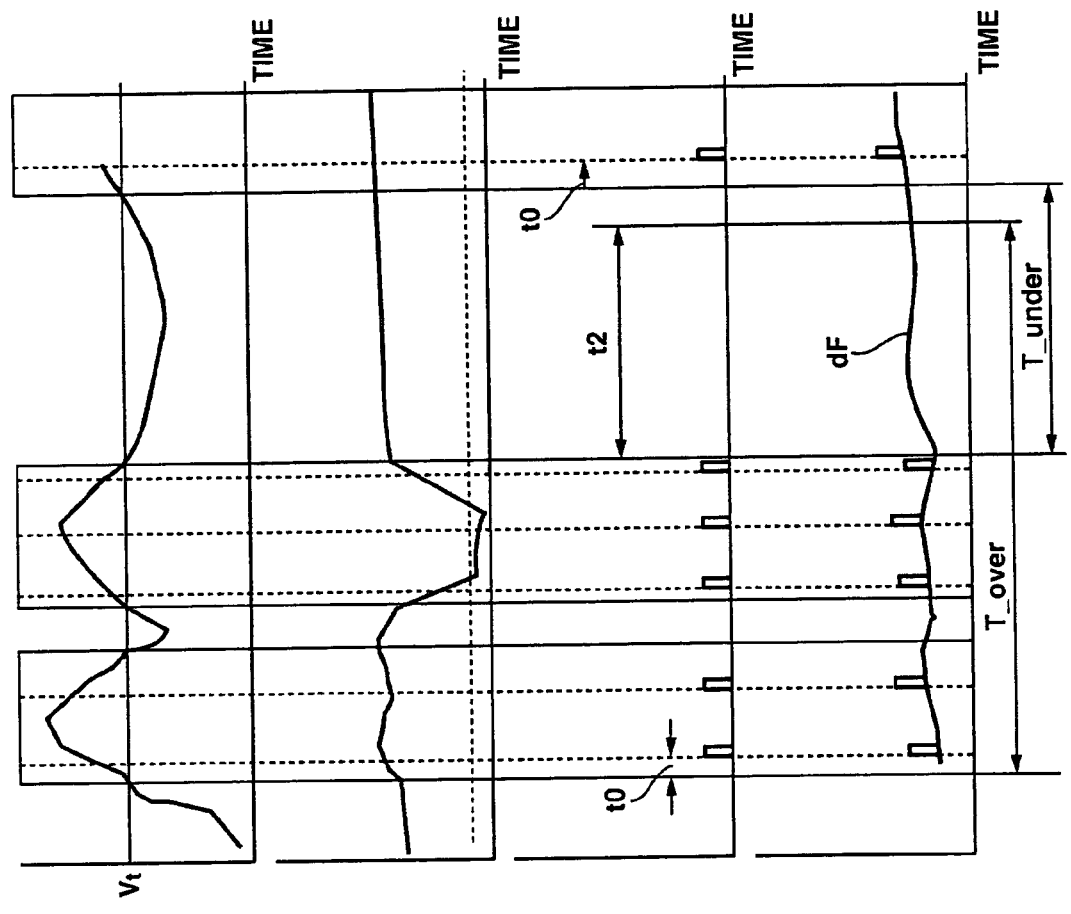
FIGS. 5(a) to 5(d) are time charts illustrating operation of the first exemplary implementation.

Referring to FIG. 4 and FIGS. 5(*a*) to 5(*d*), the following describes reaction force control employed by the first exemplary implementation of the present invention. FIG. 4 illustrates a flow chart of a driver assisting control program executed by the controller 60 used in the first exemplary implementation of the present invention. FIGS. 5(a) to 5(d) are time charts illustrating time variations of vehicle speed Vf, accelerator pedal position Sp, click reaction force Fc and accelerator pedal reaction force instruction value FA, respectively. The execution of the program illustrated in FIG. 4 is repeated at regular intervals for example, every 50 msec.

In FIG. 4, at step S101, the controller 60 performs a reading operation of output signals from the laser radar 10, front camera 20 and vehicle speed sensor 30 to obtain information on the running environment around the vehicle. At step S102, the controller 60 performs analysis of the obtained information to recognize the environment state around the vehicle by calculating a distance D to each of the obstacles, and a relative speed Vr to each obstacle. If an obstacle is a preceding vehicle, the relative speed Vr is given by subtracting a vehicle speed Vf of the vehicle (illustrated in FIG. 2) operated by a driver from a vehicle speed Vp of the preceding vehicle (Vr=Vp−Vf).

At step S103, using the distance D, relative speed Vr, and vehicle speed Vf, the controller 60 calculates a risk perceived RP by the driver from each obstacle within the environment around the vehicle. In this exemplary implementation, the controller 60 calculates a risk perceived RP by the driver from the preceding vehicle. The risk perceived RP may be expressed by two concepts, namely, a time to collision TTC and a time headway THW.

The TTC is a measure of time from a current moment to a future moment when the distance D would become zero if the relative speed Vr to the preceding vehicle remains unaltered. The TTC may be expressed as:

$$TTC=-D/Vr \quad \text{(Eq. 1)}$$

The smaller the value of TTC, the more imminent is the collision and the larger is the value of an extent the vehicle has approached the preceding vehicle. In a traffic situation where a vehicle is following the preceding vehicle, most vehicle drivers perceive a high degree of risk and initiate deceleration to avoid collision well before the TTC becomes less than 4 seconds. To some extent, the TTC is a good indication for predicting a future behavior the vehicle driver might take. However, when it comes to quantifying the degree of risk, which the vehicle driver actually perceives, there is a discrepancy between the TTC and the degree of risk. Thus, the TTC alone is insufficient to quantify the degree of risk.

Such discrepancy may be confirmed by considering a traffic situation where the relative speed Vr is zero. In this case, the TTC is infinite irrespective of how narrow the distance D is. However, the vehicle operator perceives an increase in the degree of risk in response to a reduction in the distance D, accounting for an increase in how much an unpredictable drop in a vehicle speed of the preceding vehicle might influence the TTC.

To remedy the above-mentioned discrepancy, the concept of time headway THW has been introduced to quantify an increase how much an unpredictable drop in the vehicle speed of the preceding vehicle might influence the TTC in a traffic situation where the vehicle is following the preceding vehicle with the distance D kept constant. The THW is a measure of a timer that is set to count when the preceding vehicle reaches a point on a road and will be subsequently reset when the following vehicle reaches the same point. The THW is expressed as, $$THW=D/Vf \quad \text{(Eq. 2)}$$

In the case where the vehicle is following the preceding vehicle, the vehicle speed of the preceding vehicle may be used instead of the vehicle speed Vf in equation 2.

The relationship between the two concepts TTC and THW is such that when a change in vehicle speed, if any, of the preceding vehicle results in a small change in the TTC when the THW is long, but the same change in vehicle speed of the preceding vehicle results in a large change in the TTC when the THW is short.

In the exemplary implementation, the risk perceived RP is expressed as a sum of a first extent and a second extent. The first extent represents how much the vehicle has approached the preceding vehicle. The second extent represents how much an unpredictable change in vehicle speed of the preceding vehicle might influence the vehicle. The first extent is determined as a function of the reciprocal of time to collision TTC, and the second extent is determined as a function of the reciprocal of time headway THW.

In the first exemplary implementation, as mentioned above, the reciprocal of TTC determines the first extent, and the reciprocal of THW determines the second extent. The risk perceived RP is expressed as, $$RP=a/THW+b/TTC \quad \text{(Eq. 3)}$$

where: b and a (b>a) are parameters weighting 1/TTC and 1/THW, respectively, such that 1/THW is less weighted than 1/TTC. The values of b and a are optimized after accounting for statistics of values of THW and TTC collected in a traffic situation including one vehicle following another vehicle. In this exemplary implementation, b=8 and a=1.

At step S104, responsive to the risk perceived RP calculated at step S103, the controller 60 calculates a stimulus to the driver in the form of an accelerator pedal reaction force increment dF. In the first exemplary implementation, the reaction force increment dF is proportional to the risk perceived RP and may be expressed as:

$$dF=k1 \cdot RP \quad \text{(Eq. 4)}$$

where: k1 is a constant previously set as an appropriate value.

At step S111, the controller 60 calculates a vehicle speed standard Vt. The vehicle speed standard Vt is a vehicle speed determined for a current area of a road which the vehicle is running through. Firstly, the controller 60 receives information on a current position of the vehicle that is continuously detected by an appropriate system, for example, a navigation system and accesses the vehicle speed information database 40 to obtain a vehicle speed limit for the area of the road which the vehicle is running through. Accounting for the vehicle speed limit, error in the vehicle speed sensor 30 and fuel economy, the controller 60 sets a recommended vehicle speed Vt0. The controller 60 may access a database to obtain an appropriate vehicle speed value for use as the recommended vehicle speed Vt0. Such database may contain appropriate vehicle speed values, which may be used as the recommended vehicle speed Vt0, arranged against different values of vehicle speed limit and different kinds of road.

Using the recommended vehicle speed Vt0, the controller 60 calculates the vehicle speed standard Vt. The vehicle speed standard Vt may be expressed as:

$$Vt=Vt0+\alpha \quad \text{(Eq. 5)}$$

In the equation 5, α(alpha) indicates a predetermined value for setting an appropriate value as the vehicle speed standard Vt against a given value of the recommended vehicle speed Vt0. The predetermined value of a should be set to give an appropriate value as the vehicle speed standard Vt against a given value of the recommended vehicle speed Vt0 accounting for an inevitably occurring error in the vehicle speed sensor 30. Thus, as shown by the equation 5, adding the predetermined value of a to the recommended vehicle speed Vt0 gives the vehicle speed standard Vt. This vehicle speed standard Vt may be regarded as an index for estimating a potential risk which might be actualized within the environment around the vehicle in the future. For example, if the vehicle is running at a vehicle speed faster than the vehicle speed standard Vt, an estimate that a risk may grow in the future is justified.

At step S112, the controller 60 compares the vehicle speed Vf detected at step S101 to the vehicle speed standard Vt calculated at step S111 by determining whether or not the vehicle speed Vf is equal to or greater than the vehicle speed standard Vt. If the vehicle speed Vf is equal to or greater than the vehicle speed standard Vt, the logic goes to step S113. At step S113, the controller 60 calculates a time elapsed $T_{\_over}$ from a moment immediately after the vehicle speed Vf became equal to or greater than the vehicle speed standard Vt. At the next step S114, the controller 60 determines whether or not occurrence of a click reaction force is counted by a click frequency counter called COUNT. Specifically, at step S114, it is determined whether or not the content of the click frequency counter COUNT is equal to 0 (zero).

Determining, at step S114, that the content of the click frequency counter COUNT is zero (COUNT=0) means that no click reaction force has occurred since the vehicle speed Vf became equal to or greater than the vehicle speed standard Vt. If this is the case, the logic proceeds to step S115. At step S115, the controller 60 determines whether or not the time elapsed $T_{\_over}$ has exceeded a predetermined click starting period t0. The predetermined click starting period t0 is herein used to mean a fixed or a variable period, which is set immediately after the vehicle speed Vf has become equal to or greater than the vehicle speed standard Vt and kept set as long as the vehicle speed Vf stays equal to or greater than the vehicle speed standard Vt. If, at step S115, the time elapsed $T_{\_over}$ has exceeded the predetermined click starting period t0, the logic continues to step S117 and onwards for generation of a click reaction force.

Determining, at step S114, that the content of the click frequency counter COUNT is equal to or greater than 1 (COUNT#0) means that a click reaction force has occurred since the vehicle speed Vf became equal to or greater than the vehicle speed standard Vt. If this is the case, the logic proceeds to step S116. At step S116, the controller 60 determines whether or not a click time $T_{\_on}$, which is a time elapsed from a moment immediately after occurrence of a click reaction force, has exceeded a predetermined click interval t1. The predetermined click interval is an interval between the adjacent two click reaction forces. If, at step S116, it is determined that the click time $T_{\_on}$ has exceeded the predetermined click interval t1 ($T_{\_on}$>t1), the logic goes to step S117 and onwards for generation of another click reaction force.

At step S117, the controller 60 resets the click time $T_{\_on}$. At the next step S118, the controller 60 updates the click frequency counter COUNT. Subsequently, at step S119, the controller resets a time elapsed $T_{\_under}$ from a moment immediately after the vehicle speed Vf became less than the vehicle speed standard Vt. At the next step S120, the controller 60 sets a click reaction force Fc which is herein used to mean a one-shot pulse-like additional force to the reaction force increment dF calculated at step S104. Thus, the click reaction force Fc has a magnitude (comparable to a pulse height) and a duration (comparable to a pulse width) during which the magnitude of force is continuously applied. In this exemplary implementation, both the magnitude and duration are predetermined fixed values, respectively.

If, at step S116, the click time $T_{\_on}$ is equal to or less than the predetermined click interval t1, the logic continues to step S121. At step S121, the controller 60 performs updating by increasing the click time $T_{\_on}$ by unit amount of time, and the logic proceeds to step S122. The logic also continues to step S122 from step S115 if, at step S115, the time elapsed $T_{\_over}$ is equal to or less than the predetermined click starting period t0. At step S122, the controller 60 sets the magnitude of a click reaction force Fc equal to 0 (Fc=0) to prevent occurrence of such click reaction force Fc.

After setting the click reaction force Fc at step S120 or S122, the logic moves to step S131. At step S131, the controller 60 calculates an accelerator pedal reaction force instruction value FA, i.e., a value indicative of a magnitude of a reaction force instructed to be applied to an accelerator pedal using the reaction force increment dF calculated at step S104 and the click reaction force Fc set at step S120 or S122. The accelerator pedal reaction force instruction value FA may be expressed as:

$$FA = dF + Fc \qquad \text{(Eq. 6)}$$

At the next step S132, the controller 60 provides, as an output, the reaction force instruction value FA to an accelerator pedal reaction force control unit 80. In response to the reaction force instruction value FA provided by the controller 60, the accelerator pedal reaction force control unit 80 performs regulation of reaction force for the accelerator pedal 82, applying different forms of tactile stimulus to the vehicle driver for keeping the driver informed of the risk perceived RP around the vehicle and how the vehicle deviates from the vehicle speed standard Vt.

If, at step S112, the vehicle speed Vf is less than the vehicle speed standard Vt, the logic proceeds to step S123. At step S123, the controller 60 calculates a time elapsed $T_{\_under}$ from a moment immediately after the vehicle speed Vf became less than the vehicle speed standard Vt. At the next step S124, the controller 60 determines whether or not the time elapsed $T_{\_under}$ has exceeded a predetermined reset period t2. If, at step S124, the time elapsed $T_{\_under}$ has exceeded the predetermined reset period t2, the logic goes to step S125. At step S125, the controller 60 resets the click frequency counter COUNT. At the next step S126, the controller 60 resets the time elapsed $T_{\_over}$. At the next step S127, the controller 60 resets or clears the click time $T_{\_on}$ ($T_{\_on}$=0). Then, the logic moves to step S122. At step S122, the controller 60 sets the magnitude of a click reaction force Fc equal to 0 (Fc=0).

If, at step S124, the time elapsed $T_{\_under}$ is less than the predetermined reset period t2, the logic goes directly to step S122 without resetting the click frequency counter COUNT (step S125), the time elapsed $T_{\_over}$ (step S126), and the click time $T_{\_on}$ (step S127). At step S122, the controller 60 sets the magnitude of a click reaction force Fc equal to 0 (Fc=0).

FIGS. 5(a)-5(d) illustrate how the first exemplary implementation of a driver assisting system 1 operates. As illustrated in FIGS. 5(a)-5(d), a click reaction force Fc occurs upon expiration of the predetermined click starting period t0 after the vehicle speed Vf became greater than or equal to the vehicle speed standard Vt. Subsequently, a train of click reaction forces Fc occur at the predetermined click interval t1 that is constant as long as the vehicle speed Vf remains greater than or equal to the vehicle speed standard Vt. At the same time, the reaction force increment dF for the risk perceived RP occurs together with the train of click reaction forces Fc at the accelerator pedal 82. Thus, the driver perceives a continuous variation of the reaction force for the accelerator pedal 82 to receive information on the calculated risk perceived RP and a discontinuous and distinct temporary change of the reaction force for the accelerator pedal 82 to receive information on how the vehicle deviates from the vehicle speed standard Vt.

Referring back to steps S117, S121 and S127, it will be readily understood that the controller 60 does not reset but stops increasing the click time $T_{\_on}$ as long as the time elapsed $T_{\_under}$ is less than the predetermined reset period t2 (step S124). If the time elapsed $T_{\_under}$ is less than the predetermined reset period t2, the controller 60 resumes increasing the click time $T_{\_on}$ (step S121) immediately after the vehicle speed Vf has become greater than or equal to the vehicle speed standard Vt again. In other words, before or upon expiration of the predetermined reset period t2 beginning with the moment immediately after the vehicle speed Vf became less than the vehicle speed standard Vt, the controller 60 may resume increasing the click time $T_{\_on}$ immediately after the vehicle speed Vt has become greater than or equal to the vehicle speed standard Vt again. Subsequently, regardless of expiration of the predetermined click starting period t0, the controller 60 may allow a click reaction force Fc to occur when the click time $T_{\_on}$ exceeds the predetermined click interval t1.

After expiration of the predetermined reset period t2, the controller 60 resets the click frequency counter COUNT (step S232), the time elapsed $T_{\_over}$ (step S233) and the click time $T_{\_on}$ (step S234). Thus, expiration of the predetermined click starting period t0 is needed before the controller 60 allows a click reaction force Fc to occur after the vehicle speed Vt has become greater than or equal to the vehicle speed standard Vt again.

The above-mentioned first exemplary implementation gives effects as follows:

(1) The controller 60 calculates a risk perceived RP by a driver around a vehicle operated by the driver and information on how the vehicle deviates from a vehicle speed standard Vt. This information is considered to represent a potential risk, which is a risk not yet perceived by the driver but should be notified to the drive. The information is provided to the driver by applying to the driver different forms of tactile stimulus derived from the same instrumentality the driver usually keeps in contact with during driving the vehicle. Thus, the driver is kept informed of such pieces of information by paying attention to the different forms of tactile stimulus derived from the single instrumentality. As the different forms of tactile stimulus are used, the driver quickly understands different bits of information. As the different forms of tactile stimulus are derived from the single instrumentality, the overall system may be simplified.

(2) The driver perceives different forms of tactile stimulus derived from an accelerator pedal 82 to obtain information on a risk perceived RP by the driver from an obstacle, such as a preceding vehicle, and information on how much the vehicle deviates from the vehicle speed standard Vt. Thus, the driver is kept informed of an actual risk, perceived by the driver, within a current environment around the vehicle and a potential risk that might become an actual risk in the future.

(3) The driver perceives a continuous variation of the reaction force from the accelerator pedal 82 to continuously get information on a risk perceived RP by the driver from an obstacle, such as a preceding vehicle because the reaction force represents the risk perceived RP. The driver perceives a discontinuous and distinct temporary change of the reaction force (a click reaction force) from the accelerator pedal 82 and is urged to pay attention to the fact that the vehicle speed Vf exceeds the vehicle speed standard Vt because the click reaction force represents how much the vehicle speed Vf exceeds the vehicle speed standard Vt.

(4) The driver is warned of the fact that the vehicle speed Vf exceeds the vehicle speed standard Vt because the controller 60 calculates how much the vehicle speed Vf exceeds from the vehicle speed standard Vt for production of a train of click reaction forces when the vehicle speed Vf exceeds the vehicle speed standard Vt.

Second Exemplary Implementation of the Invention

With continuing reference to FIGS. 1 to 3, a second exemplary implementation of a driver assisting system according to the present invention is substantially the same in hardware as the first exemplary implementation. However, as shown in phantom line in FIG. 1, the second exemplary implementation is different from the first exemplary implementation in that a controller 60 monitors an accelerator pedal stroke sensor 83 to get an accelerator pedal position Sp of an accelerator pedal 82 as illustrated by phantom line in FIG. 1. As the discussion proceeds, one may understand that the accelerator pedal position Sp is used in calculating a click reaction force Fc.

The second exemplary implementation of the present invention informs a vehicle driver of the fact that a vehicle speed Vf exceeds a vehicle speed standard Vt more positively than the first exemplary implementation does. To inform the driver more positively, the vehicle speed standard Vt, a click starting period t0, a click interval t1, and a reset period t2 are altered. A click reaction force Fc is altered in magnitude, too.

Figure 6:
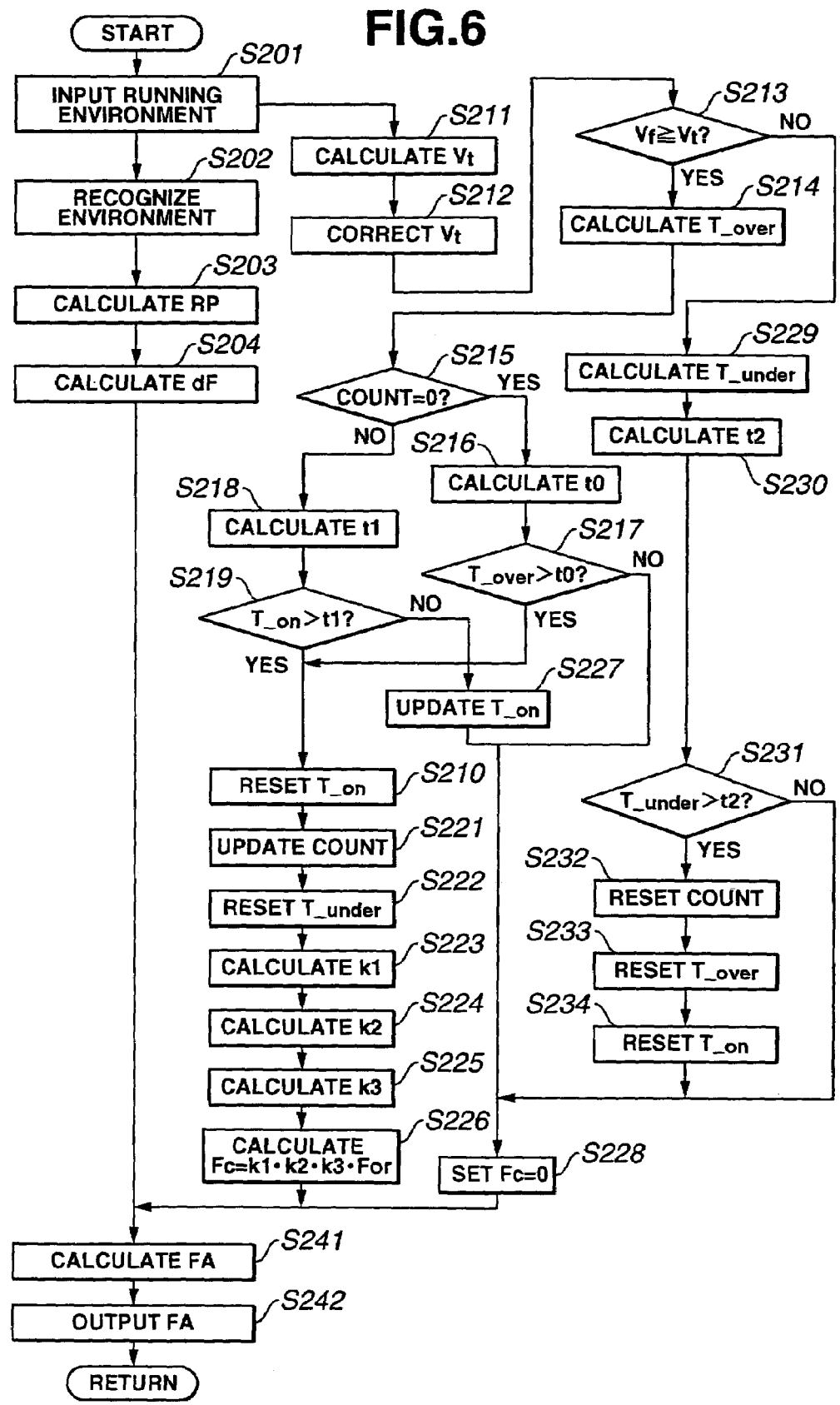
FIG. 6 is a flow chart illustrating operation of a second exemplary implementation of a driver assisting system according to the present invention.
Figures 7A, 7B, 7C, 7D:
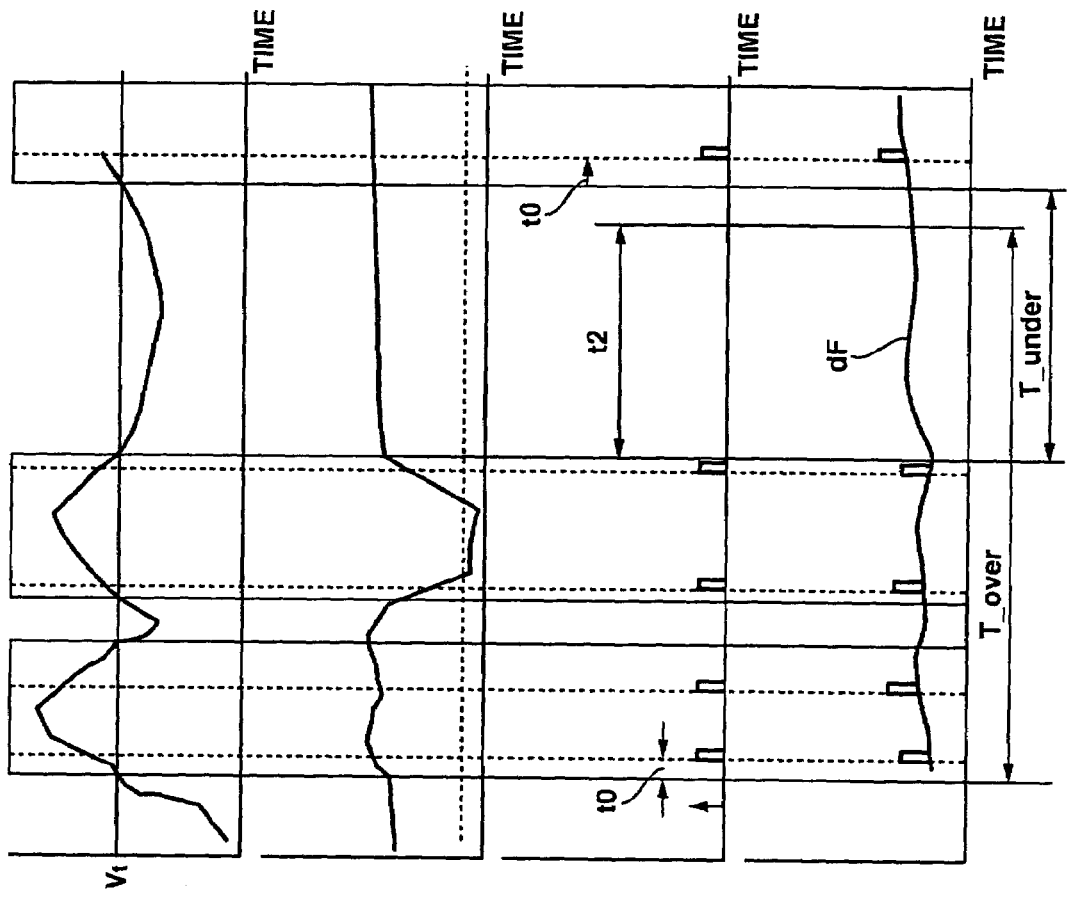
FIGS. 7(a) to 7(d) are time charts illustrating operation of the second exemplary implementation.

Referring to FIG. 6 and FIGS. 7(a) to 7(d), the following describes on reaction force control employed by the second exemplary implementation of the present invention. FIG. 6 illustrates a flow chart of a driver assisting control program executed by a controller 60 used in the second exemplary implementation of the present invention. FIGS. 7(a) to 7(d) are time charts illustrating time variations of vehicle speed Vf, accelerator pedal position Sp, click reaction force Fc and accelerator pedal reaction force instruction value FA, respectively. The execution of the program illustrated in FIG. 6 is repeated at regular intervals, for example, every 50 msec.

In FIG. 6, at step S201, the controller 60 performs a reading operation of output signals from the accelerator pedal stroke sensor 83, a vehicle speed sensor 30, a laser radar 10, and a front camera 20 to obtain information on running environment around the vehicle. At step S202, the controller 60 performs analysis of the obtained information to recognize the state of the environment around the vehicle by calculating a distance D to a preceding vehicle and a relative speed Vr to the preceding vehicle. The relative speed Vr is given by subtracting a vehicle speed Vf of the vehicle operated by a driver from a vehicle speed Vp of the preceding vehicle (Vr=Vp−Vf).

After step S202, the logic goes to steps S203 and S204. At step S203, the controller 60 calculates a risk perceived RP. At step S204, the controller 60 calculates an accelerator pedal reaction force increment dF. For brevity, further description on what the controller 60 performs at steps S203 and S204 is hereby omitted because the steps S203 and S204 correspond to steps S103 and S104 of the flow chart in FIG. 4, respectively.

At step S211 following step S201, the controller 60 calculates a vehicle speed standard Vt. Because the step S211 corresponds to step S111 of the flow chart in FIG. 4, further description on what the controller 60 performs at step S211 is hereby omitted for brevity.

Figure 8:
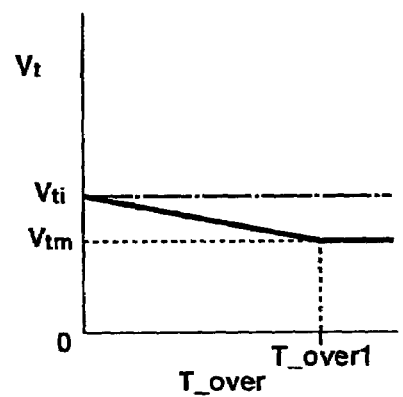
FIG. 8 illustrates an exemplary relationship between a vehicle speed standard as corrected and a time elapsed from a moment immediately after vehicle speed has exceeded the vehicle speed standard.

At the next step S212, the controller 60 corrects the vehicle speed standard Vt. Specifically, the controller 60 sets a value given at step S211 as an initial vehicle speed standard value Vti, and corrects the initial vehicle speed standard value Vti based on a time elapsed $T_{\_over}$ that is a time elapsed from a moment immediately after the vehicle speed Vf became equal to or greater than the vehicle speed standard Vt as corrected. The fully drawn line in FIG. 8 illustrates an exemplary relationship between the vehicle speed standard Vt as corrected and the time elapsed $T_{\_over}$. In FIG. 8, the one-dot-chain line illustrates the initial vehicle speed standard value Vti that is the value given at step S211, and the dotted line illustrates the minimum (or lowest) vehicle speed standard value Vtm.

As illustrated in FIG. 8, the controller 60 determines the vehicle speed standard Vt by lowering the vehicle speed standard Vt from the initial vehicle speed standard value Vti toward the minimum vehicle speed standard value Vtm as the time elapsed $T_{\_over}$ increases. Lowering the vehicle speed standard Vt continues until a moment when the time elapsed $T_{\_over}$ reaches a predetermined value $T_{\_over}1$. Upon and after the moment when the time elapsed $T_{\_over}$ reaches the predetermined value $T_{\_over}1$, the controller 60 sets the minimum vehicle speed standard value Vtm as the vehicle speed standard Vt. The vehicle speed standard Vt drops as the time elapsed $T_{\_over}$ increases, causing an increase in frequency of a click reaction force Fc as will be described later.

At step S213, the controller 60 determines whether or not the vehicle speed Vf is equal to or greater than the vehicle speed standard Vt as corrected at step S212. If the vehicle speed Vf is equal to or greater than the vehicle speed standard Vt, the logic moves to step S214. At step S214, the controller 60 calculates the above-mentioned time elapsed $T_{\_over}$, which is a time elapsed from a moment immediately after the vehicle speed Vf became equal to or greater than the vehicle speed standard Vt. At the next step S215, the controller 60 determines whether or not the content of a click frequency counter COUNT is equal to 0 (zero).

Figure 9:
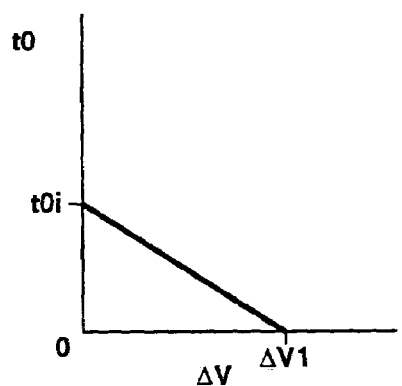
FIG. 9 illustrates an exemplary varying of a click starting period with different values of an excess by which the vehicle speed exceeds the vehicle speed standard.

Determining, at step S215, that the content of the click frequency counter COUNT is zero (COUNT=0) means that no click reaction force has occurred since the vehicle speed Vf became equal to or greater than the vehicle speed standard Vt. If this is the case, the logic moves to step S216. At step S216, the controller 60 determines a click starting period t0. In this second exemplary implementation, the controller 60 determines the click starting period t0 based on an excess $\Delta V$ by which the vehicle speed Vf exceeds the vehicle speed standard Vt ($\Delta V=Vf-Vt$). In FIG. 9, the fully drawn line illustrates an exemplary varying of the click starting period t0 with different values of the excess $\Delta V$.

In FIG. 9, the reference character t0i indicates an initial value of the click starting period t0. As indicated by the fully drawn line in FIG. 9, the controller 60 determines the click starting period t0 by shortening the click starting period from the initial value t0i toward a minimum value of, for example 0 (zero), as the excess $\Delta V$ increases if the excess $\Delta V$ is less than a predetermined excess value $\Delta V1$. If the excess $\Delta V$ is equal to or greater than the predetermined excess value $\Delta V1$, the controller 60 sets the minimum value of 0 as the click starting period t0. As a result, the controller 60 allows a click reaction force Fc to occur quickly after the vehicle speed Vf has greatly exceeded the vehicle speed standard Vt by shortening the click starting period t0.

At step S217, the controller 60 determines whether or not the time elapsed $T_{\_over}$ has exceeded the click starting period t0. If, at step S217, the time elapsed $T_{\_over}$ has exceeded the click starting period t0, the logic goes to step S220.

Figure 10:
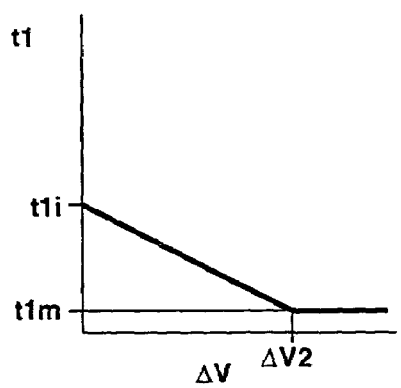
FIG. 10 illustrates an exemplary varying of a click interval with different values of the excess by which the vehicle speed exceeds the vehicle speed standard.

Determining, at step S215, that the content of the click frequency counter COUNT is equal to or greater than 1 (0) means that a click reaction force has occurred since the vehicle speed Vf became equal to or greater than the vehicle speed standard Vt. If this is the case, the logic moves to step S218. At step S218, the controller 60 determines a click interval t1 between the adjacent two click reaction forces. In this second exemplary implementation, the controller 60 determines the click interval t1 based on the excess $\Delta V$. In FIG. 10, the fully drawn line illustrates an exemplary varying of the click interval t1 with different values of the excess $\Delta V$.

In FIG. 10, the reference characters t1i and t1m indicate an initial value and a minimum value of click interval t1, respectively. As indicated by the fully drawn line in FIG. 10, the controller 60 determines the click interval t1 by shortening the click interval t1 from the initial value t1i toward the minimum value t1m as the excess $\Delta V$ increases if the excess $\Delta V$ is less than a predetermined excess value $\Delta V2$. If the excess $\Delta V$ is equal to or greater than the predetermined excess value $\Delta V2$, the controller 60 sets the minimum value t1m as the click interval t1. As a result, the controller 60 allows an increase in the number of click reaction forces Fc occurring within a unit time by shortening the click interval t1 if the vehicle speed Vf greatly exceeds the vehicle speed standard Vt.

At step S219, the controller 60 determines whether or not a click time $T_{\_on}$, which is a time elapsed from a moment immediately after occurrence of a click reaction force, has exceeded the click interval t1 determined at step S218. If, at step S219, the click time $T_{\_on}$ has exceeded the click interval t1 ($T_{\_on}$>t1), the logic moves to step S220 and onwards for generation of another click reaction force.

At step S220, the controller 60 resets the click time $T_{\_on}$. At the next step S221, the controller 60 updates the click frequency counter COUNT. Subsequently, at step S222, the controller resets a time elapsed $T_{\_under}$ from a moment immediately after the vehicle speed Vf became less than the vehicle speed standard Vt.

At step S223, the controller 60 determines a first correction coefficient k1 based on the excess $\Delta V$. The fully drawn line in FIG. 11 illustrates an exemplary varying of the first correction coefficient k1 with different values of the excess $\Delta V$.

Figure 11:
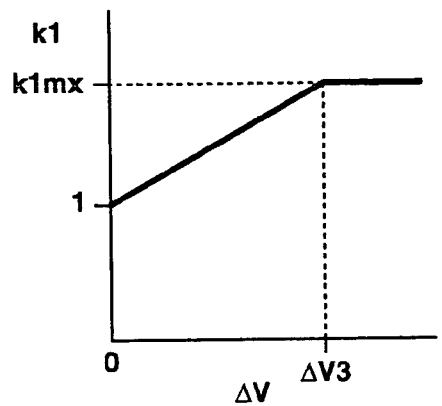
FIG. 11 illustrates an exemplary varying of a first correction coefficient with different values of the excess.

In FIG. 11, the reference character k1mx indicates a maximum value of the first correction coefficient k1. As indicated by the fully drawn line in FIG. 11, the controller 60 determines the first correction coefficient k1 by increasing the first correction coefficient k1 from an initial value of 1 (one) toward the maximum value k1mx as the excess $\Delta V$ increases if the excess $\Delta V$ is less than a predetermined excess value $\Delta V3$. If the excess $\Delta V$ is equal to or greater than the predetermined excess value $\Delta V3$, the controller 60 sets the maximum value k1mx as the first correction coefficient k1.

Figure 12:
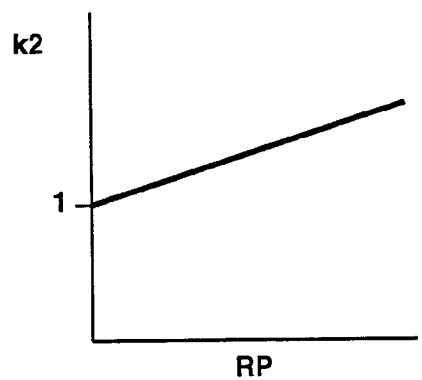
FIG. 12 illustrates an exemplary varying of a second correction coefficient with different values of risk perceived (RP)

At step S224, the controller 60 determines a second correction coefficient k2 based on the risk perceived RP calculated at step S203. The fully drawn line in FIG. 12 illustrates an exemplary varying of the second correction coefficient k2 with different values of the risk perceived RP. As indicated by the fully drawn line in FIG. 12, the controller 60 determines the second correction coefficient k2 by increasing the second correction coefficient k2 from an initial value of 1 (one) as the risk perceived RP increases.

Figure 13:
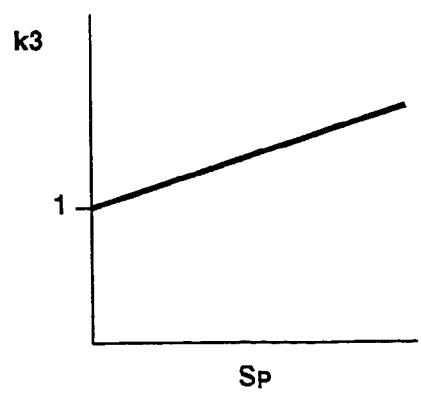
FIG. 13 illustrates an exemplary varying of a third correction coefficient with different values of an accelerator pedal position.

At step S225, the controller 60 determines a third correction coefficient k3 based on the accelerator pedal position Sp. The fully drawn line in FIG. 13 illustrates an exemplary varying of the third correction coefficient k3 with different values of the accelerator pedal position Sp. As indicated by the fully drawn line in FIG. 13, the controller 60 determines the third correction coefficient k3 by increasing the third correction coefficient k3 from an initial value of 1 (one) as the accelerator pedal position Sp increases.

At the next step S226, using the first, second and third correction coefficients k1, k2 and k3, the controller 60 calculates a magnitude of click reaction force Fc, which is expressed as:

$$Fc = k1 \cdot k2 \cdot k3 \cdot Fcr \qquad \text{(Eq. 7)}$$

where: Fcr represents a standard value of the magnitude of a click reaction force Fc.

If, at step S219, the click time $T_{on}$ is equal to or less than the click interval t1, the logic goes to step S227. At step S227, the controller 60 carries out updating by increasing the click time $T_{on}$ by unit amount of time, and the logic moves to step S228. The logic also moves to step S228 from step S217 if, at step S217, the time elapsed $T_{over}$ is equal to or less than the click starting period t0. At step S228, the controller 60 sets the magnitude of click reaction force Fc equal to 0 (Fc=0) to prevent occurrence of such click reaction force Fc.

After setting the click reaction force Fc at step S226 or S228, the logic goes to step S241. At step S241, the controller 60 calculates an accelerator pedal reaction force instruction value FA using the reaction force increment dF calculated at step S204 and the click reaction force Fc determined at step S226 or S228. The accelerator pedal reaction force instruction value FA is expressed by equation 6.

At the next step S242, the controller 60 provides, as an output, the reaction force instruction value FA to an accelerator pedal reaction force control unit 80. In response to the reaction force instruction value FA provided by the controller 60, the accelerator pedal reaction force control unit 80 performs regulation of reaction force for the accelerator pedal 82, applying different forms of tactile stimulus to the vehicle driver for keeping the driver informed of the risk perceived RP around the vehicle and how the vehicle deviates from the vehicle speed standard Vt.

If, at step S213, the vehicle speed Vf is less than the vehicle speed standard Vt, the logic continues to step S229. At step S229, the controller 60 calculates a time elapsed $T_{under}$ from a moment immediately after the vehicle speed Vf became less than the vehicle speed standard Vt. At step S230; the controller 60 determines a reset period t2 based on the time elapsed $T_{over}$. The fully drawn line in FIG. 14A illustrates an exemplary varying of the reset period t2 with different values of time elapsed $T_{over}$.

Figure 14A:
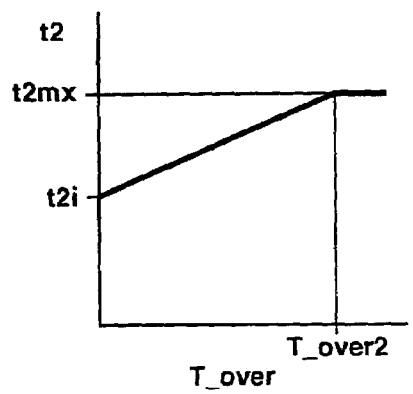
FIG. 14A illustrates an exemplary varying of a reset period with different values of the time elapsed from a moment immediately after the vehicle speed has exceeded the vehicle speed standard.

In FIG. 14A, the reference characters t2i and t2mx indicate an initial value and a maximum value of the reset period t2. As indicated by the fully drawn line in FIG. 14A, the controller 60 determines the reset period t2 by increasing the reset period t2 from the initial value of t2i toward the maximum value t2mx as the time elapsed $T_{over}$ increases if the time elapsed $T_{over}$ is less than a predetermined value $T_{over}2$. If the time elapsed $T_{over}$ is equal to or greater than the predetermined value $T_{over}2$, the controller 60 sets the maximum value t2imx as the reset period t2.

As the discussion proceeds, it will be understood that the contents of click frequency counter COUNT, time elapsed $T_{over}$, and click time $T_{on}$ are held during the reset period t2, which increases with an increase in the time elapsed $T_{over}$. Thus, if the vehicle speed Vf becomes equal to or greater than the vehicle speed standard Vt again before expiration of the reset period t2, the controller 60 allows occurrence of click reaction forces Fc having the previously set magnitude and frequency.

Figure 14B:
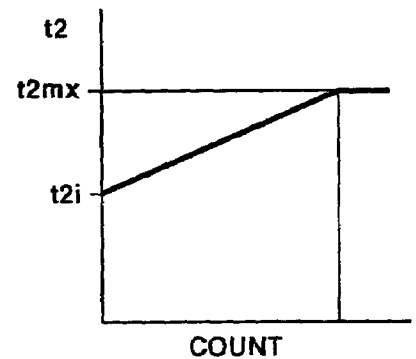
FIG. 14B illustrates an exemplary varying of a reset period with different values of the content of a click frequency counter.

Referring to FIG. 14B, as the content of the click frequency counter COUNT increases with an increase in the time elapsed $T_{over}$, the content of the click frequency counter COUNT may be used to retrieve the relationship as indicated by the fully drawn in FIG. 14B to determine an appropriate value of the reset period t2. The relationship illustrated in FIG. 14B is substantially the same as the illustrated relationship in FIG. 14A.

At the next step S231, the controller 60 determines whether or not the time elapsed $T_{under}$ has exceeded the reset period t2 that was determined at step S230. If, at step S231, the time elapsed $T_{under}$ has exceeded the reset period t2, the logic goes to step S232. At step S232, the controller 60 resets the click frequency counter COUNT. At the next step S233, the controller 60 resets the time elapsed $T_{over}$. At the next step S234, the controller 60 resets the click time $T_{on}$. Then, the logic goes to step S228. At step S228, the controller 60 sets the magnitude of a click reaction force Fc equal to 0 (Fc=0).

If, at step S231, the time elapsed $T_{under}$ is less than the reset period t2, the logic goes directly to step S228 without resetting the click frequency counter COUNT (step S232), the time elapsed $T_{over}$ (step S233), and the click time $T_{on}$ (step S234). At step S228, the controller 60 sets the magnitude of a click reaction force Fc equal to 0 (Fc=0).

FIGS. 7(a)-7(d) illustrate how the second exemplary implementation of the driver assisting system 1 operates. As illustrated in FIGS. 7(a)-7(d), a click reaction force Fc occurs upon expiration of the click starting period to that varies in response to the excess ΔV after the vehicle speed, Vf became greater than or equal to the vehicle speed standard Vt. Subsequently, a train of click reaction forces Fc occur at the click interval t1 that varies in response to the excess ΔV when the vehicle speed Vf remains greater than or equal to the vehicle speed standard Vt. The magnitude of the click reaction force Fc is determined in response to the excess ΔV, risk perceived RP, and accelerator pedal position Sp. The frequency of click reaction forces Fc increases in response to an increase in the excess ΔV. The magnitude of click reaction forces Fc increases in response to an increase in the excess ΔV, an increase in the risk perceived RP, and an increase in the accelerator pedal position Sp.

A sum given by adding the train of click reaction forces Fc to the reaction force increment dF representative of the risk perceived RP appears in the magnitude of a reaction force, which the driver perceives from the accelerator pedal 82. Thus, the driver perceives a continuous variation of the reaction force from the accelerator pedal 82 to obtain information on the calculated risk perceived RP and a discontinuous and distinct temporary change of the reaction force from the accelerator pedal 82 to obtain information on how the vehicle deviates from the vehicle speed standard Vt. The driver perceives a change in the magnitude of click reaction forces Fc to obtain information on a change in the risk perceived RP and a change in the interval between the adjacent two click reaction forces to get information on a change in the excess ΔV. An increase in potential risk is positively brought to the attention of the driver via the drivers perception of an increase in frequency of the click reaction forces Fc caused by a drop in the vehicle speed standard Vt when the vehicle speed Vf exceeds the vehicle speed standard Vt over extended period of time.

Referring back to steps S220, S227 and S234 of the flow chart illustrated in FIG. 6, it will be readily understood that the controller 60 does not reset but stops increasing the click time $T_{on}$ as long as the time elapsed $T_{under}$ is less than the reset period t2 (step S231). If the time elapsed $T_{under}$ is less than the reset period t2, the controller 60 resumes increasing the click time $T_{on}$ (step S227) immediately after the vehicle speed Vf has become greater than or equal to the vehicle speed standard Vt again. In other words, before or upon expiration of the reset period t2 beginning with the moment immediately after the vehicle speed Vf became less than the vehicle speed standard Vt, the controller 60 may resume increasing the click time $T_{on}$ immediately after the vehicle speed Vt has become greater than or equal to the vehicle speed standard Vt again. Subsequently, regardless of expiration of the click starting period t0, the controller 60 may allow a click reaction force Fc to occur when the click time $T_{on}$ exceeds the click interval t1. Thus, the level of risk may be continuously and positively brought to the attention of the driver.

First Modification of the Second Exemplary Implementation

Figure 15A:
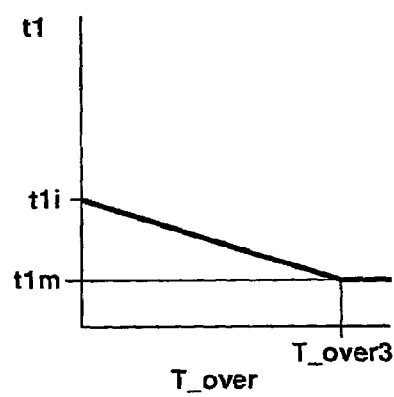
FIG. 15A illustrates an exemplary varying of a click interval with different values of the time elapsed from a moment immediately after the vehicle speed has exceeded the vehicle speed standard.

In the flow chart of FIG. 6, at step S218, the controller 60 determines the click interval t1 using the varying of click interval t1 with different values of the excess $\Delta V$ illustrated in FIG. 10. The controller 60 may determine the click interval t1 based on the time elapsed $T_{over}$ using the illustrated relationship in FIG. 15A. In FIG. 15A, the fully drawn line illustrates an exemplary varying of the click interval t1 with different values of the time elapsed $T_{over}$.

In FIG. 15A, the reference characters t1$i$ and t1$m$ indicate an initial value and a minimum value of the click interval t1, respectively. As indicated by the fully drawn line in FIG. 15A, the controller 60 determines the click interval t1 by shortening the click interval t1 from the initial value t1$i$ toward the minimum value t1$m$ as the time elapsed $T_{over}$ increases if the time elapsed $T_{over}$ is less than a predetermined time value $T_{over}3$. If the time elapsed $T_{over}$ is equal to or greater than the predetermined time value $T_{over}3$, the controller 60 sets the minimum value t1$m$ as the click interval t1.

Figure 15B:
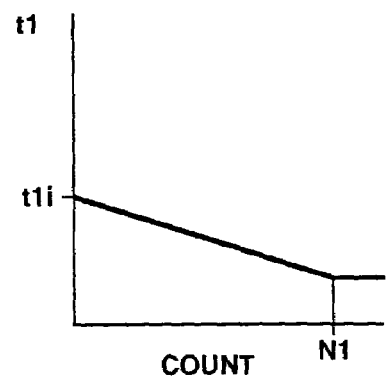
FIG. 15B illustrates an exemplary varying of a click interval with different values of the content of a click frequency counter.

The controller 60 may determine the click interval t1 based on the content of the counter COUNT instead of the time elapsed $T_{over}$ using the illustrated relationship in FIG. 15B. In FIG. 15B, the fully drawn line illustrates an exemplary varying of the click interval t1 with different values of the content of the counter COUNT.

In FIG. 15B, the reference characters t1$i$ and t1$m$ indicate an initial value and a minimum value of the click interval t1, respectively. As indicated by the fully drawn line in FIG. 15B, the controller 60 determines the click interval t1 by shortening the click interval t1 from the initial value t1$i$ toward the minimum value t1$m$ as the content of the counter COUNT increases if the content of the counter COUNT is less than a predetermined counter value N1. If the content of the counter COUNT is equal to or greater than the predetermined counter value N1, the controller 60 sets the minimum value t1$m$ as the click interval t1.

Second Modification of the Second Exemplary Implementation

In the flow chart of FIG. 6, at step S223, the controller 60 determined the first correction coefficient k1 using the varying of the first correction coefficient k1 with different values of the excess $\Delta V$ illustrated in FIG. 11. The controller 60 may determine the first correction coefficient k1 based on the time elapsed $T_{over}$ using the illustrated relationship in FIG. 16A. In FIG. 16A, the fully drawn line illustrates an exemplary varying of the first correction coefficient k1 with different values of the time elapsed $T_{over}$.

In FIG. 16A, the reference character k1$mx$ indicates a maximum value of the first correction coefficient k1. As indicated by the fully drawn line in FIG. 16A, the controller 60 determines the first correction coefficient k1 by increasing the first correction coefficient k1 from an initial value of 1 (one) toward the maximum value k1$mx$ as the time elapsed $T_{over}$ increases if the time elapsed $T_{over}$ is less than a predetermined time value $T_{over}4$. If the time elapsed $T_{over}$ is equal to or greater than the predetermined time value $T_{over}4$, the controller 60 sets the maximum value k1$mx$ as the first correction coefficient k1.

Figure 16B:
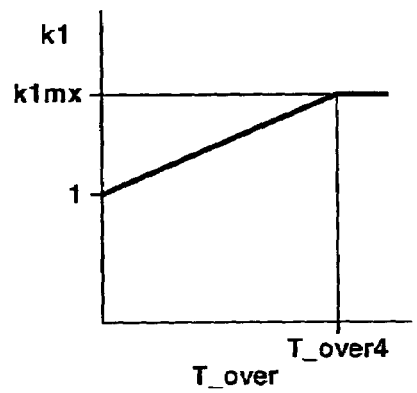
FIG. 16B illustrates an exemplary varying of the first correction coefficient with different values of the content of a click frequency-counter.
Figure 16B:
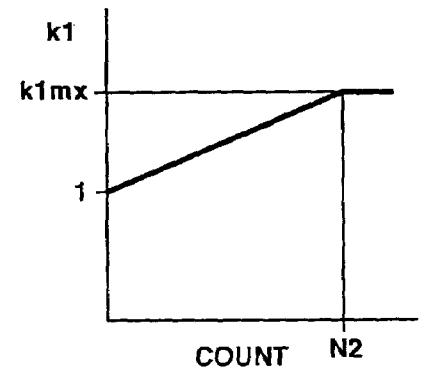

The controller 60 may determine the first correction coefficient k1 based on the content of the counter COUNT instead of the time elapsed $T_{over}$ using the illustrated relationship in FIG. 16B. In FIG. 16B, the fully drawn line illustrates an exemplary varying of the first correction coefficient k1 with different values of the content of the counter COUNT.

In FIG. 16B, the reference character k1$mx$ indicates a maximum value of the first correction coefficient k1. As indicated by the fully drawn line in FIG. 16B, the controller 60 determines the first correction coefficient k1 by increasing the first correction coefficient k1 from an initial value of 1 (one) toward the maximum value k1$mx$ as the content of the counter COUNT increases if the content of the counter COUNT is less than a predetermined counter value N2. If the content of the counter COUNT is equal to or greater than the predetermined counter value N2, the controller 60 sets the maximum value k1$mx$ as the first correction coefficient k1.

In addition to the effects provided by the first exemplary implementation, the above-mentioned second exemplary implementation gives further effects as follows:

(1) The vehicle driver can perceive intuitively how much the vehicle speed Vf exceeds the vehicle speed standard Vt by feeling varying of the click interval t1 and/or varying, in magnitude, of click reaction forces Fc with different values of the excess, in state or amount, by which the vehicle speed Vf exceeds the vehicle speed standard Vt because the controller 60 calculates the excess, in state or amount, to alter the click interval t1 and/or the magnitude of click reaction forces Fc. The driver can perceive positively the fact that the vehicle speed Vf exceeds the vehicle speed standard Vt by feeling an increase in frequency of click reaction forces Fc caused when the excess $\Delta V$ or the time elapsed $T_{over}$ is great.

(2) The driver can get information on the risk perceived RP from an obstacle as well as the vehicle speed standard Vt by feeling varying, in magnitude, of click reaction forces Fc with different levels of the risk perceived RP because the controller 60 alters the magnitude of click reaction forces Fc based on the risk perceived RP from the obstacle.

(3) The driver is urged to pay attention to the fact that the vehicle speed Vf exceeds the vehicle speed standard Vt when the driver depresses the accelerator pedal 82 deeply by increasing the magnitude of click reaction forces Fc because the controller 60 alters the magnitude of click reaction forces Fc based on the accelerator pedal position Sp.

Third Exemplary Implementation of the Invention

With continuing reference to FIGS. 1 to 3, a third exemplary implementation of a driver assisting system according to the present invention is substantially the same in hardware as the first exemplary implementation. However, as different from the first exemplary implementation, the third exemplary implementation permits a vehicle driver to identity how much a vehicle speed Vf exceeds a vehicle speed standard Vt with a number of times a click reaction force Fc is repeated within a limited span of time.

Figure 17:
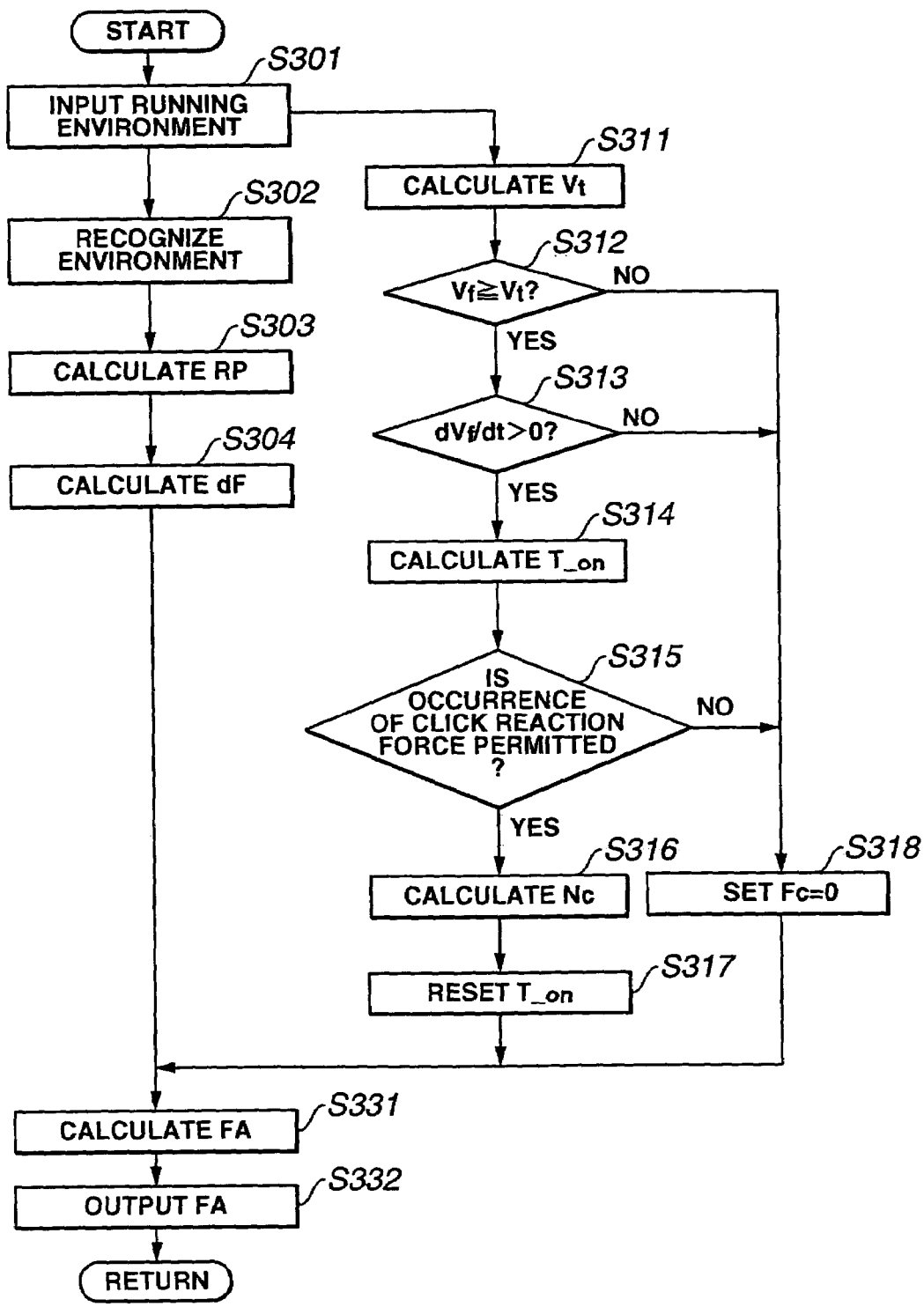
FIG. 17 is a flow chart illustrating operation of a third exemplary implementation of the present invention.

Referring to FIG. 17 and FIGS. 18(*a*) to 18(*d*), the following provides description on reaction force control employed by the second exemplary implementation of the present invention. FIG. 17 illustrates a flow chart of a driver assisting control program executed by a controller 60 used in the third exemplary implementation of the present invention. FIGS. 18(*a*) to 18(*d*) are time charts illustrating time variations of vehicle speed Vf, accelerator pedal position Sp, click reaction force Fc and accelerator pedal reaction force instruction FA, respectively. The execution of the program illustrated in FIG. 17 is repeated at regular intervals, for example, every 50 msec.

In FIG. 17, at step S301, the controller 60 performs a reading operation of output signals from the accelerator pedal stroke sensor 83, a vehicle speed sensor 30, a laser radar 10, and a front camera 20 to obtain information on running environment around the vehicle. At step S302, the controller 60 performs analysis of the obtained information to recognize the state of environment around the vehicle by calculating a distance D to a preceding vehicle and a relative speed Vr to the preceding vehicle. The relative speed Vr is given by subtracting a vehicle speed Vf of the vehicle operated by a driver from a vehicle speed Vp of the preceding vehicle (Vr=Vp−Vf).

After step S302, the logic goes to steps S303 and S304. At step S303, the controller 60 calculates a risk perceived RP. At step S304 the controller 60 calculates an accelerator pedal reaction force increment dF. For brevity, further description on what the controller 60 performs at steps S303 and S304 is hereby omitted because the steps S303 and S304 correspond to steps S103 and S104 of the flow chart in FIG. 4, respectively.

At step S311 following the previously mentioned step S301, the controller 60 determines a vehicle speed standard Vt. Because the step S211 corresponds to step S111 of the flow chart in FIG. 4, further description on what the controller 60 performs at step S311 is hereby omitted for brevity.

At step S312, the controller 60 determines whether or not the vehicle speed Vf is equal to or greater than a predetermined vehicle speed standard Vt. If the vehicle speed Vf is equal to or greater than the predetermined vehicle speed standard Vt, the logic goes to step S313.

At step S313, the controller 60 determines whether or not the vehicle speed Vf, which has been found to be equal to or greater than the vehicle speed standard Vt at step S312, is increasing. In particular, the controller 60 calculates time differential dVf/dt of the vehicle speed Vf and determines whether or not the calculated time differential dVf/dt is greater than 0 (zero). The controller 60 determines that the vehicle speed Vf is increasing if the time differential dVf/dt is greater than 0, and it determines that the vehicle speed is constant or decreasing if the time differential dVf/dt is equal to or less than 0. If, at step S313, the time differential dVf/dt is greater than 0 (the vehicle speed Vf increasing), the logic moves to S314. At step 314, the controller 60 updates a click time $T_{\_on}$, which, in this exemplary implementation, is a time elapsed from a moment immediately after or upon the first occurrence of a click reaction force Fc within a predetermined time frame having span of time ta, which is later described later in connection with FIG. 19.

Figures 18A, 18B, 18C, 18D:
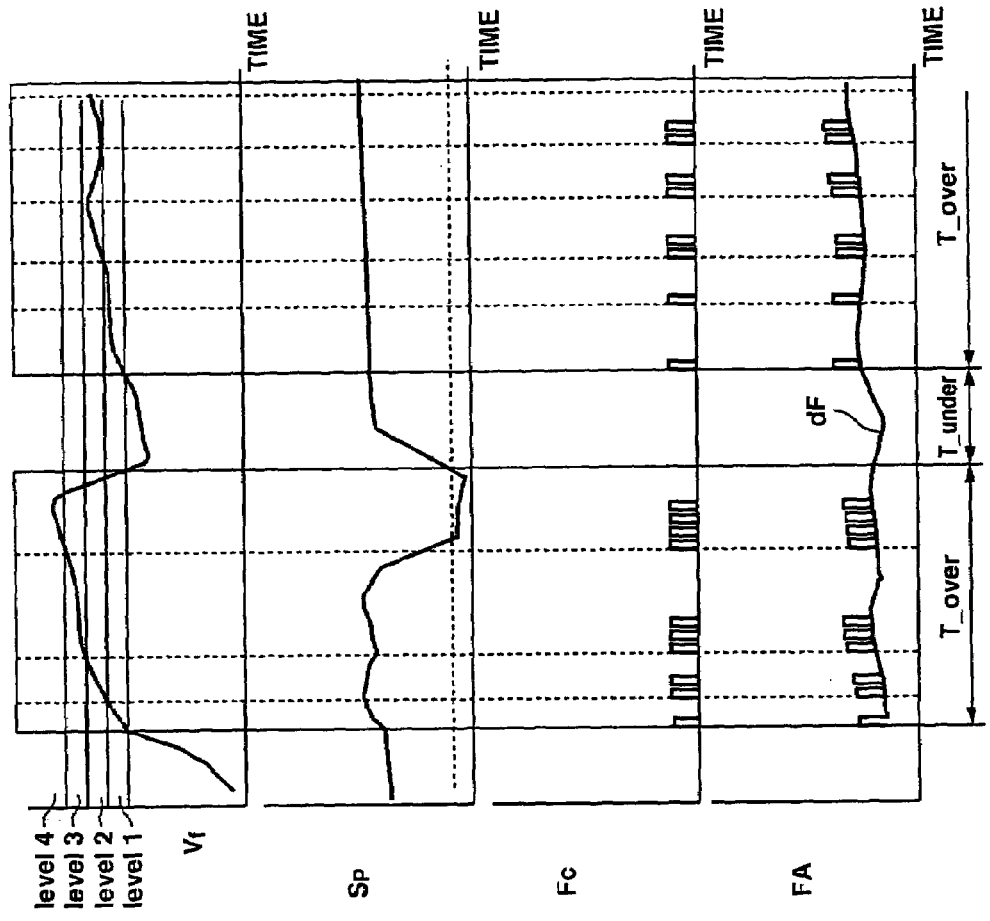
FIGS. 18(a) to 18(d) are time charts illustrating operation of the third exemplary implementation.

At the next step S315, the controller 60 determines, based on the click time $T_{\_on}$ determined at step S314 and a current excess level, which the vehicle speed Vf belongs to, whether or not occurrence of a click reaction force Fc is permitted. The excess level is a level of an excess by which the vehicle speed Vf exceeds the vehicle speed standard Vt. Referring to FIG. 18(a), in this exemplary implementation, the controller 60 has four excess levels, which represent four band regions with the same width Va given after dividing a range of vehicle speeds exceeding the vehicle speed standard Vt. The four excess levels are an excess level 1, an excess level 2, an excess level 3 and an excess level 4. The excess level 1 represents a first band region consisting of vehicle speed values equal to or greater than the vehicle speed standard Vt but less than a vehicle speed (Vt+Va). The excess level 2 represents a second band region consisting of vehicle speed values equal to or greater than the vehicle speed (Vt+Va) but less than a vehicle speed (Vt+2Va). The excess level 3 represents a third band region consisting of vehicle speed values equal to or greater than the vehicle speed (Vt+2Va) but less than a vehicle speed (Vt+3Va). Finally, the excess level 4 represents a fourth band region consisting of vehicle speed values equal to or greater than the vehicle speed (Vt+3Va) but less than a vehicle speed (Vt+4Va). In this exemplary implementation, the controller 60 determines which one of the four excess levels the vehicle speed Vf belongs to.

Figure 19:
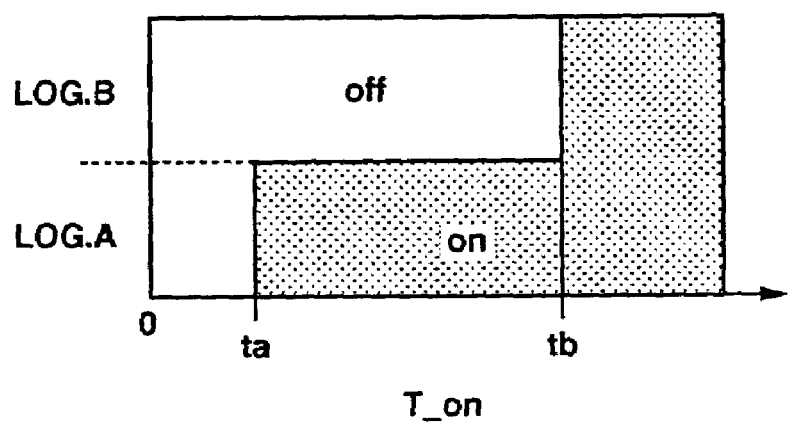
FIG. 19 illustrates two examples of logic.

At step S315, in determining whether or not occurrence of a click reaction force Fc is permitted, the controller 60 may use one of two examples of logic as illustrated in FIG. 19 in this exemplary implementation. Referring to FIG. 19, the horizontal axis represents the click time $T_{\_on}$ and has thereon the before-mentioned time frame ta, and a predetermined interval tb (tb>ta). The reference character "LOG. A" indicates logic illustrated by a lower half in FIG. 19. The logic "LOG. A" prohibits occurrence of a click reaction force Fc upon a change in the excess level until expiration of the time frame ta, thus permitting occurrence of a click reaction force Fc upon a change in the excess level upon or after expiration of the time frame ta. The logic "LOG. A" also provides that, if the excess level remains unchanged upon or after expiration of the time frame ta, no click reaction force Fc will occur. The reference character "LOG. B" indicates complementary logic to the logic "LOG. A". This complementary logic "LOG. B" permits occurrence of a click reaction force Fc upon expiration of the predetermined interval tb even if the excess level remains unchanged. It will now be noted that the logic "LOG. A" alone constitute the one of the above-mentioned two examples of logic, which the controller 60 may use in performing job at step S315. The logic "LOG. A" as complemented by the logic "LOG. B" constitutes other example of logic, which the controller 60 uses in performing job at step S315 according to this exemplary implementation.

According to this exemplary implementation, within a range where the vehicle speed Vf is equal to or greater than the vehicle speed standard, the controller 60 permits occurrence of a click reaction force Fc upon a change in the excess level upon or after expiration of the time frame ta. Upon or after expiration of the predetermined interval tb (tb>ta), the controller 60 permits occurrence of a click reaction force Fc even if the excess level remains unchanged. According to this exemplary implementation, if the vehicle speed Vf exceeds the vehicle speed standard Vt, the controller 60 permits occurrence of a click reaction force Fc immediately after the vehicle speed Vf has exceeded the vehicle speed standard Vt because the vehicle speed Vf enters the excess level 1. As will be later described, the controller 60 permits a single click reaction force Fc to occur immediately after the vehicle speed Vf has exceeded the vehicle speed standard Vt into the excess level 1.

Figure 20:
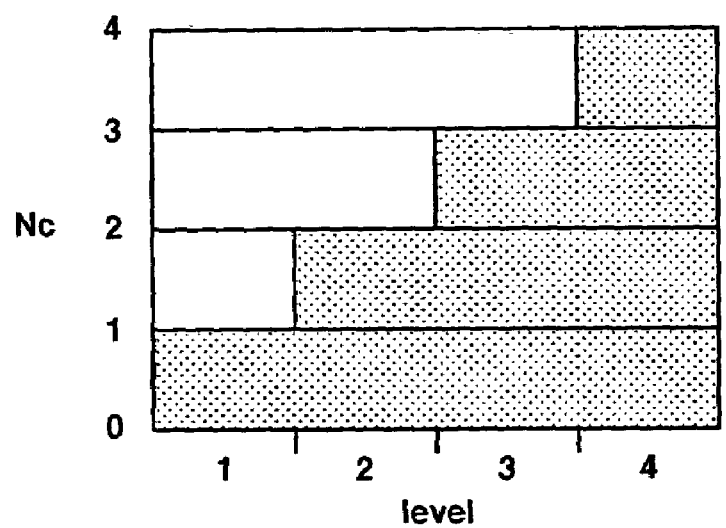
FIG. 20 illustrates varying of number of times a click reaction force is repeated with different excess levels.

If, at step S315, the occurrence of a click reaction force Fc is permitted, the logic moves to step S316. At step S316, the controller 60 determines a number Nc of times a click reaction force Fc is repeated based on the excess level, which the vehicle speed Vf belongs to. FIG. 20 illustrates varying of number Nc of times a click reaction force Fc is repeated with different excess levels 1, 2, 3 and 4. As is readily seen from FIG. 20, the controller 60 sets one (1) as the number Nc when the vehicle speed Vf belongs to the excess level 1, permitting one click reaction force Fc to occur within the time frame ta. When the vehicle speed Vf belongs to the excess level 2, the controller 60 sets two (2) as the number Nc, permitting two click reaction forces Fc to occur within the time frame ta. When the vehicle speed Vf belongs to the excess level 3, the controller 60 sets three (3) as the number Nc, permitting three click reaction forces Fc to occur within the time frame ta. When the vehicle speed vf belongs to the excess level 4, the controller 60 sets four (4) as the number Nc, permitting four click reaction forces Fc to occur within the time frame ta. The setting is such that the magnitude of a click reaction forces Fc is predetermined.

At the next step S317, the controller 60 resets the click time $T_{\_on}$ ($T_{\_on}=0$).

If, at step S312, the vehicle speed Vf is less than the vehicle speed standard Vt, or if, at step S313, the vehicle speed Vf is decreasing (df/dt<0), or if, at step S315, the logic goes to step S318. At step S318, the controller 60 sets the magnitude of a click reaction force Fc equal to 0 (Fc=0) to prevent occurrence of such click reaction force Fc.

After step S317 or S318, the logic goes to step S331. At step S331, the controller 60 calculates an accelerator pedal reaction force instruction value FA using the reaction force increment dF calculated at step S304 and the click reaction force Fc. The accelerator pedal reaction force instruction value FA is expressed by the equation 6 mentioned before.

At the next step S332, the controller 60 provides, as an output, the reaction force instruction value FA to an accelerator pedal reaction force control unit 80. In response to the reaction force instruction value FA provided by the controller 60, the accelerator pedal reaction force control unit 80 performs regulation of reaction force for the accelerator pedal 82.

FIGS. 18(a)-18(d) illustrate how the third exemplary implementation of the driver assisting system operates. As illustrated in FIGS. 18(a)-18(d), a single click reaction force Fc is permitted to occur upon the vehicle speed Vf exceeding the vehicle speed standard Vt. Subsequently, upon a shift of the vehicle speed Vf from the excess level 1 to the excess level 2, two click reaction forces Fc are permitted to occur. Upon a shift of the vehicle speed Vf from the excess level 2 to the excess level 3, three click reaction forces Fc are permitted to occur. Upon a shift of the vehicle speed Vf from the excess level 3 to the excess level 4, four click reaction forces are permitted to occur. No click reaction force Fc is permitted to occur upon a change in the excess level if the vehicle speed Vf is decreasing. The vehicle driver can perceive how the vehicle speed Vf varies after exceeding the vehicle speed standard Vt by feeling varying of the number Nc of times a click reaction force Fc is repeated with different excess levels when the vehicle speed Vf is increasing in excess of the vehicle speed standard Vt.

If the vehicle speed Vf continues to stay in the excess level 1 after occurrence of single click reaction force Fc upon the vehicle speed Vf exceeding the vehicle speed standard Vt, another single click reaction force Fc is permitted to occur upon expiration of the predetermined interval tb. If the vehicle speed Vf continues to stay in the excess level 2, two click reaction forces Fc are permitted to occur upon expiration the predetermined interval tb. In this manner, since the corresponding number of times a click reaction force Fc is repeated to one excess level is repeated regularly at the predetermined interval tb if the vehicle speed Vf continues to stay in the same excess level, the vehicle driver is urged to pay attention to how much the vehicle speed Vf exceeds the vehicle speed standard Vt.

In addition to the effects provided by the first and second exemplary implementations, the above-mentioned third exemplary implementation gives further effects as follows:

The controller 60 alters the number Nc of times a click reaction force Fc is repeated based on the excess ΔV from the vehicle speed standard Vt. The vehicle driver is urged to pay attention to how greatly the vehicle speed Vf exceeds the vehicle speed standard Vt because the number Nc of times a click reaction force Fc is repeated increases.

Fourth Exemplary Implementation of the Invention

With continuing reference to FIGS. 1 to 3, a fourth exemplary implementation of a driver assisting system according to the present invention is substantially the same in hardware as the first exemplary implementation. However, as shown in phantom line in FIG. 1, the fourth exemplary implementation is different from the first exemplary implementation in that a controller 60 monitors an accelerator pedal stroke sensor 83 to obtain an accelerator pedal position Sp of an accelerator pedal 82 as illustrated by phantom line in FIG. 1. As the discussion proceeds, one may understand that the accelerator pedal position Sp is used in calculating a click reaction force Fc.

The fourth exemplary implementation of the present invention keeps a vehicle driver informed of the fact that a vehicle speed Vf exceeds a vehicle speed standard Vt without causing the driver to feel an objection to receiving such information. To accomplish this object, the vehicle speed standard Vt and a reset period t2 are altered. A click reaction force Fc is altered in magnitude, too.

Figure 21:
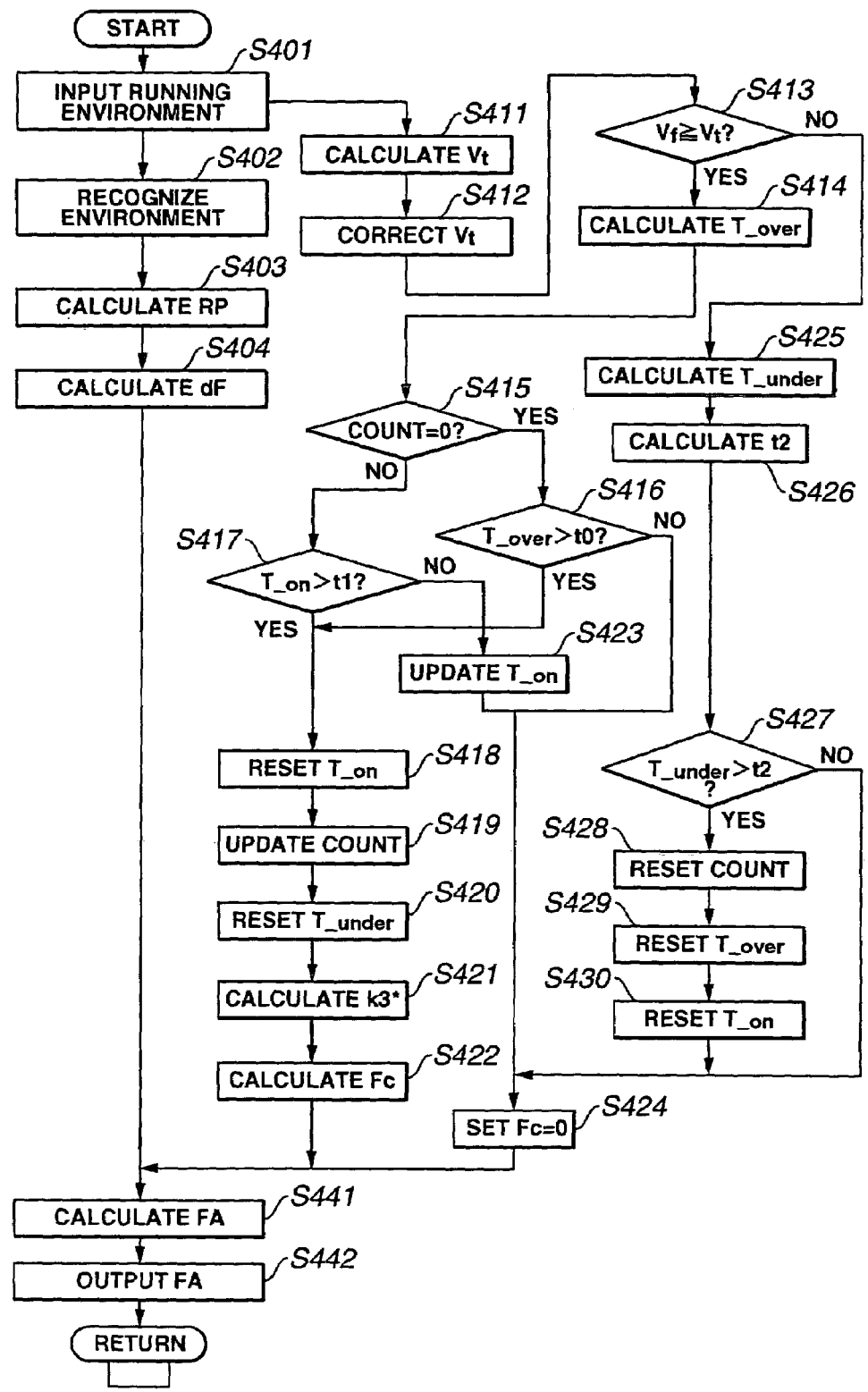
FIG. 21 is a flow chart illustrating operation of a fourth exemplary implementation of the present invention.

Referring to FIG. 21, the following describes reaction force control employed by the fourth exemplary implementation of the present invention. FIG. 21 illustrates a flow chart of a driver assisting control program executed by a controller 60 used in the fourth exemplary implementation of the present invention. The execution of the program illustrated in FIG. 21 is repeated at regular intervals, for example, every 50 msec.

In FIG. 21, at step S401, the controller 60 performs a reading operation of output signals from the accelerator pedal stroke sensor 83, a vehicle speed sensor 30, a laser radar 10, and a front camera 20 to obtain information on running environment around the vehicle. At step S402, the controller 60 performs analysis of the obtained information to recognize the state of the environment around the vehicle by calculating a distance D to a preceding vehicle and a relative speed Vr to the preceding vehicle. The relative speed Vr is given by subtracting a vehicle speed Vf of the vehicle operated by a driver from a vehicle speed Vp of the preceding vehicle (Vr=Vp−Vf).

After step S402, the logic moves to steps S403 and S404. At step S403, the controller 60 calculates a risk perceived RP. At step S404 the controller 60 calculates an accelerator pedal reaction force increment dF. For brevity, further description on what the controller 60 performs at steps S403 and S404 is hereby omitted because the steps S403 and S404 correspond to steps S103 and S104 of the flow chart in FIG. 4, respectively.

At step S411 following the previously mentioned step S401, the controller 60 calculates a vehicle speed standard Vt. Because the step S211 corresponds to step S111 of the flow chart in FIG. 4, further description on what the controller 60 performs at step S411 is hereby omitted for brevity.

Figure 22:
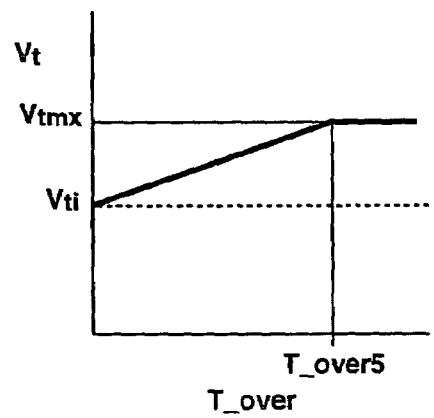
FIG. 22 illustrates an exemplary relationship between a vehicle speed standard as corrected and time elapsed after a moment immediately after the vehicle speed has exceeded the vehicle speed standard.

At the next step S412, the controller 60 corrects the vehicle speed standard Vt. Specifically, the controller 60 sets a value given at step S411 as an initial vehicle speed standard value Vti, and corrects the initial vehicle speed standard value Vti based on a time elapsed $T_{\_over}$ that is a time elapsed from a moment immediately after the vehicle speed Vf became equal to or greater than the vehicle speed standard Vt as corrected. The fully drawn line in FIG. 22 illustrates an exemplary relationship between the vehicle speed standard Vt as corrected and the time elapsed $T_{\_over}$. In FIG. 22, the one-dot-chain line illustrates the initial vehicle speed standard value Vti that is the value given at step S411, and the dotted line illustrates the maximum (or highest) vehicle speed standard value Vtmx.

As illustrated in FIG. 22, the controller 60 determines the vehicle speed standard Vt by increasing the vehicle speed standard Vt from the initial vehicle speed standard value Vti toward the maximum vehicle speed standard value Vtmx as the time elapsed $T_{\_over}$ increases. Increasing the vehicle speed standard Vt continues until a moment when the time elapsed $T_{\_over}$ reaches a predetermined value $T_{\_over}5$. Upon and after the moment when the time elapsed $T_{\_over}$ reaches the predetermined value $T_{\_over}5$, the controller 60 sets the maximum vehicle speed standard value Vtmx as the vehicle speed standard Vt. The vehicle speed standard Vt increases as the time elapsed $T_{\_over}$ increases, causing a reduction in frequency of a click reaction force Fc. The reduction in frequency of the click reaction force Fc is considered to be effective in preventing the driver from feeling objection to receiving the click reaction force Fc.

At step S413, the controller 60 determines whether or not the vehicle speed Vf is equal to or greater than the vehicle speed standard Vt as corrected at step S412. If the vehicle speed Vf is equal to or greater than the vehicle speed standard Vt, the logic goes to step S414. At step S414, the controller 60 calculates the above-mentioned time elapsed $T_{\_over}$, which is a time elapsed from a moment immediately after the vehicle speed Vf became equal to or greater than the vehicle speed standard Vt. At the next step S415, the controller 60 determines whether or not the content of a click frequency counter COUNT is equal to 0 (zero).

Determining, at step S415, that the content of the click frequency counter COUNT is zero (COUNT=0) means that no click reaction force has occurred since the vehicle speed Vf became equal to or greater than the vehicle speed standard Vt. If this is the case, the logic moves to step S416. At step S416, the controller 60 determines whether or not the time elapsed $T_{\_over}$ has exceeded a predetermined click starting period to. If, at step S416, the time elapsed $T_{\_over}$ has exceeded the predetermined click starting period t0, the logic continues to step S418 and onwards for generation of another click reaction force.

Determining, at step S415, that the content of the click frequency counter COUNT is equal to or greater than 1 (0) means that a click reaction force has occurred since the vehicle speed Vf became equal to or greater than the vehicle speed standard Vt. If this is the case, the logic moves to step S417. At step S417, the controller 60 determines whether or not a click time $T_{\_on}$, which is a time elapsed from a moment immediately after occurrence of a click reaction force, has exceeded a predetermined click interval t1. If, at step S417, the click time $T_{\_on}$ has exceeded the predetermined click interval t1 ($T_{\_on}>t1$), the logic moves to step S418 and onwards for generation of another click reaction force.

At step S418, the controller 60 resets the click time $T_{\_on}$. At the next step S419, the controller 60 updates the click frequency counter COUNT. Subsequently, at step S420, the controller resets a time elapsed $T_{\_under}$ from a moment immediately after the vehicle speed Vf became less than the vehicle speed standard Vt.

Figure 23:
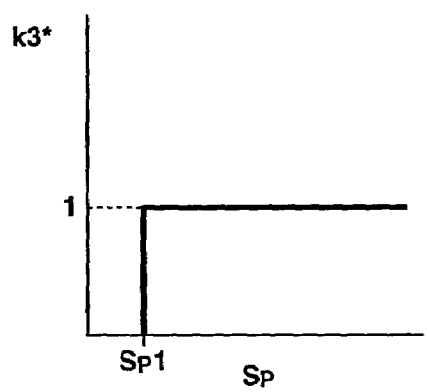
FIG. 23 illustrates an exemplary varying of a correction coefficient with different values of an accelerator pedal position.

At step S421, the controller 60 determines a correction coefficient k3* based on the accelerator pedal position Sp. The fully drawn line in FIG. 23 illustrates an exemplary varying of the correction coefficient k3* with different values of the accelerator pedal position Sp. As indicated by the fully drawn line in FIG. 23, the controller 60 sets a value 0 (zero) as the correction coefficient k3* when the accelerator pedal position Sp is less than a predetermined value Sp1, for preventing generation of a click reaction force Fc. When the accelerator pedal position Sp is equal to or greater than the predetermined value Sp1, the controller 60 sets a value 1 as the correction coefficient k3*, for permitting occurrence of a click reaction force Fc.

At the next step S422, using the correction coefficient k3*, the controller 60 calculates a magnitude of click reaction force Fc, which is expressed as:

$$Fc = k3^* \cdot Fcr \qquad (Eq.\ 8)$$

where: Fcr represents a standard value of the magnitude of a click reaction force Fc.

If, at step S417, the click time $T_{\_on}$ is equal to or less than the click interval t1, the logic moves to step S423. At step S423, the controller 60 carries out updating by increasing the click time $T_{\_on}$ by an unit amount of time, and the logic moves to step S424. The logic also moves to step S424 from step S416 if, at step S416, the time elapsed $T_{\_over}$ is equal to or less than the predetermined click starting period t0. At step S424, the controller 60 sets the magnitude of click reaction force Fc equal to 0 (Fc=0) to prevent occurrence of such click reaction force Fc.

After setting the click reaction force Fc at step S422 or S424, the logic proceeds to step S441. At step S441, the controller 60 calculates an accelerator pedal reaction force instruction value FA using the reaction force increment dF calculated at step S404 and the click reaction force Fc determined at step S422 or S424. The accelerator pedal reaction force instruction value FA is expressed by equation 6.

At the next step S442, the controller 60 provides, as an output, the reaction force instruction value FA to an accelerator pedal reaction force control unit 80. In response to the reaction force instruction value FA provided by the controller 60, the accelerator pedal reaction force control unit 80 performs regulation of reaction force for the accelerator pedal 82, applying different forms of tactile stimulus to the vehicle driver for keeping the driver informed of the risk perceived RP around the vehicle and how the vehicle deviates from the vehicle speed standard Vt.

If, at step S413, the vehicle speed Vf is less than the vehicle speed standard Vt, the logic proceeds to step S425. At step S425, the controller 60 calculates a time elapsed $T_{\_under}$ from a moment immediately after the vehicle speed Vf became less than the vehicle speed standard Vt. At step S426, the controller 60 determines a reset period t2 based on the time elapsed $T_{\_over}$. The fully drawn line in FIG. 24A illustrates an exemplary varying of the reset period t2 with different values of time elapsed $T_{\_over}$.

Figure 24A:
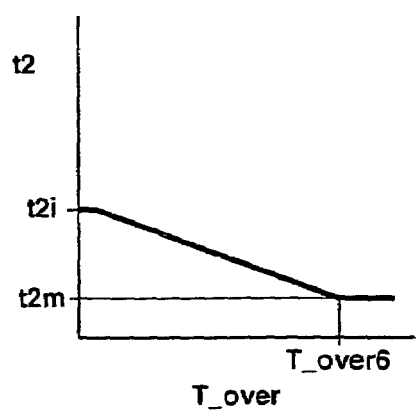
FIG. 24A illustrates an exemplary varying of a reset period with different values of time elapsed from a moment immediately after the vehicle speed has exceeded the vehicle speed standard.

In FIG. 24A, the reference characters t2i and t2im indicate an initial value and a minimum value of the reset period t2. As indicated by the fully drawn line in FIG. 24A, the controller 60 determines the reset period t2 by shortening the reset period t2 from the initial value of t2i toward the minimum value t2m as the time elapsed $T_{\_over}$ increases if the time elapsed $T_{\_over}$ is less than a predetermined value $T_{\_over}6$. If the time elapsed $T_{\_over}$ is equal to or greater than the predetermined value $T_{\_over}6$, the controller 60 sets the minimum value t2m as the reset period t2.

Figure 24B:
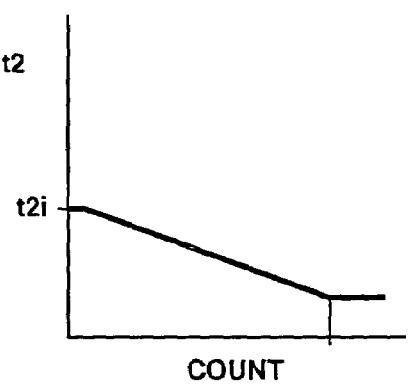
FIG. 24B illustrates an exemplary varying of a reset period with different values of time elapsed from a moment immediately after the vehicle speed has exceeded the vehicle speed standard.

Referring to FIG. 24B, as the content of the click frequency counter COUNT increases with an increase in the time elapsed $T_{\_over}$, the content of the click frequency counter COUNT may be used to retrieve the relationship as indicated by the fully drawn in FIG. 24B to determine an appropriate value of the reset period t2. The relationship illustrated in FIG. 24B is substantially the same as the illustrated relationship in FIG. 24A.

At the next step S427, the controller 60 determines whether or not the time elapsed $T_{\_under}$ has exceeded the reset period t2 that was determined at step S426. If, at step S427, the time elapsed $T_{\_under}$ has exceeded the reset period t2, the logic proceeds to step S428. At step S428, the controller 60 resets the click frequency counter COUNT. At the next step S429, the controller 60 resets the time elapsed $T_{\_over}$. At the next step S430, the controller 60 resets the click time $T_{\_on}$. Then, the logic moves to step S424. At step S424, the controller 60 sets the magnitude of a click reaction force Fc equal to 0 (Fc=0).

If, at step S427, the time elapsed $T_{\_under}$ is less than the reset period t2, the logic goes directly to step S228 without resetting the click frequency counter COUNT (step S428), the time elapsed $T_{\_over}$ (step S429), and the click time $T_{\_on}$ (step S430). At step S424, the controller 60 sets the magnitude of a click reaction force Fc equal to 0 (Fc=0).

If the time elapsed $T_{\_under}$ or the click frequency counter COUNT counted up until the vehicle speed Vf dropped below the vehicle speed standard Vt becomes longer, the reset period t2, during which the time elapsed $T_{\_under}$ and the click frequency counter COUNT stop counting up, becomes shorter. Thus, if the vehicle speed Vf becomes equal to or greater than the vehicle speed standard Vt again before expiration of the reset period t2, the rule available until the vehicle speed Vf dropped below the vehicle speed standard Vt will govern appearance of click reaction force Fc.

First Modification of the Fourth Exemplary Implementation

Figure 25A:
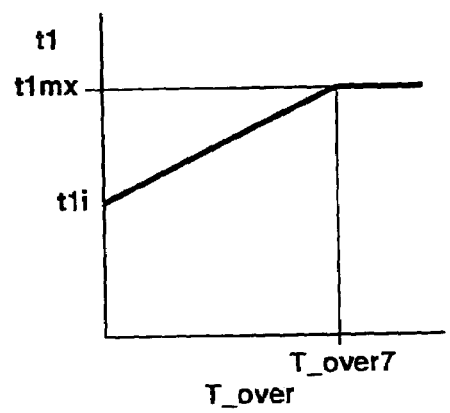
FIG. 25A illustrates an exemplary varying of a click interval with different values of time elapsed from a moment immediately after the vehicle speed has exceeded the vehicle speed standard.

The controller 60 may determine the click interval t1 based on the time elapsed $T_{\_over}$ using the illustrated relationship in FIG. 25A. In FIG. 25A, the fully drawn line illustrates an exemplary varying of the click interval t1 with different values of the time elapsed $T_{\_over}$.

In FIG. 25A, the reference characters t1$i$ and t1$mx$ indicate an initial value and a maximum value of the click interval t1, respectively. As indicated by the fully drawn line in FIG. 25A, the controller 60 determines the click interval t1 by elongating the click interval t1 from the initial value t1$i$ toward the maximum value t1$mx$ as the time elapsed $T_{\_over}$ increases if the time elapsed $T_{\_over}$ is less than a predetermined time value $T_{\_over}7$. If the time elapsed $T_{\_over}$ is equal to or greater than the predetermined time value $T_{\_over}7$, the controller 60 sets the maximum value t1$mx$ as the click interval t1. Thus, when the time elapsed $T_{\_over}$ is long, elongating the click interval t1 reduces the number of click reaction forces Fc, preventing the driver from feeling objection to receiving the click reaction forces Fc. Setting the click interval t1 in this manner based on the time elapsed $T_{\_over}$ provides more effective setting of the frequency of click reaction forces Fc if the reset period t2 is set using the illustrated relationship in FIG. 24A or 24B.

Figure 25B:
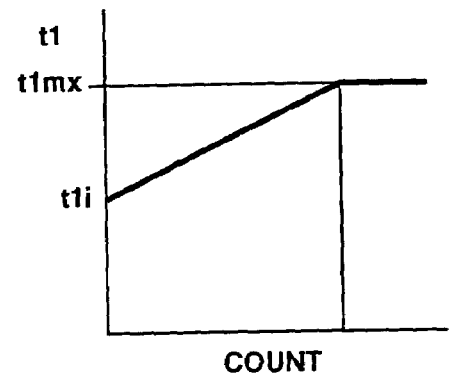
FIG. 25B illustrates an exemplary varying of a click interval with different values of the content of a click frequency counter.

Referring to FIG. 25B, as the content of the click frequency counter COUNT increases with an increase in the time elapsed $T_{\_over}$, the content of the click frequency counter COUNT may be used to retrieve the relationship as indicated by the fully drawn in FIG. 25B to determine an appropriate value of the click interval t1. The relationship illustrated in FIG. 25B is substantially the same as the illustrated relationship in FIG. 25A.

Second Modification of the Fourth Exemplary Implementation

At step S422, using a correction coefficient k1* in addition to the correction coefficient k3*, the controller 60 may calculate a magnitude of click reaction force Fc, which is expressed as:

$$Fc = k1^* \cdot k3^* \cdot Fcr \quad \text{(Eq. 9)}$$

Figure 26A:
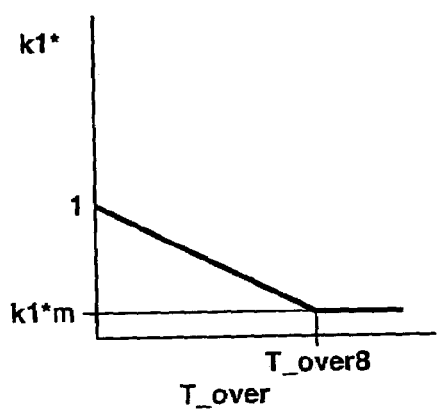
FIG. 26A illustrates an exemplary varying of a correction coefficient with different values of time elapsed from a moment immediately after the vehicle speed has exceeded the vehicle speed standard.

In this modification, the controller 60 may determine the correction coefficient k1* based on the time elapsed $T_{\_over}$ using the illustrated relationship in FIG. 26A. In FIG. 26A, the fully drawn line illustrates an exemplary varying of the correction coefficient k1* with different values of the time elapsed $T_{\_over}$.

In FIG. 26A, the reference character k1*mx indicates a minimum value of the correction coefficient k1*mx. As indicated by the fully drawn line in FIG. 26A, the controller 60 determines the correction coefficient k1* by decreasing the correction coefficient k1* from an initial value of 1 (one) toward the minimum value k1*m as the time elapsed $T_{\_over}$ increases if the time elapsed $T_{\_over}$ is less than a predetermined time value $T_{\_over}8$. If the time elapsed $T_{\_over}$ is equal to or greater than the predetermined time value $T_{\_over}8$, the controller 60 sets the minimum value k1*m as the correction coefficient k1*. Using the correction coefficient k1*, the magnitude of a click reaction force Fc becomes smaller as the time elapsed $T_{\_over}$ becomes longer, thus preventing the driver from feeling an objection to receiving the click reaction force Fc.

Figure 26B:
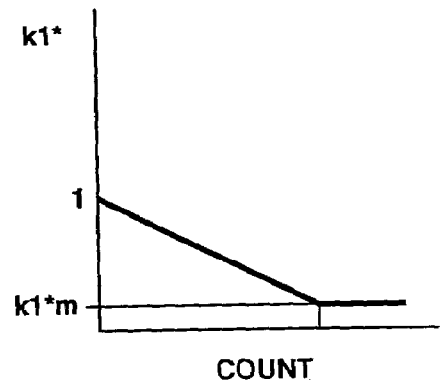
FIG. 26B illustrates an exemplary varying of a correction coefficient with different values of the content of a click frequency counter.

The controller 60 may determine the correction coefficient k1* based on the content of the counter COUNT instead of the time elapsed $T_{\_over}$ using the illustrated relationship in FIG. 26B. In FIG. 26B, the fully drawn line illustrates an exemplary varying of the correction coefficient k1* with different values of the content of the counter COUNT. The illustrated relationship in FIG. 26B is substantially the same as the illustrated relationship in FIG. 26A.

Third Modification of the Fourth Exemplary Implementation

Figure 27:
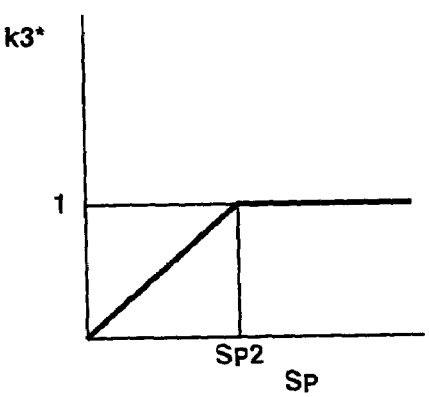
FIG. 27 illustrates an exemplary varying of a correction coefficient with different values of an accelerator pedal position.
Figure 28:
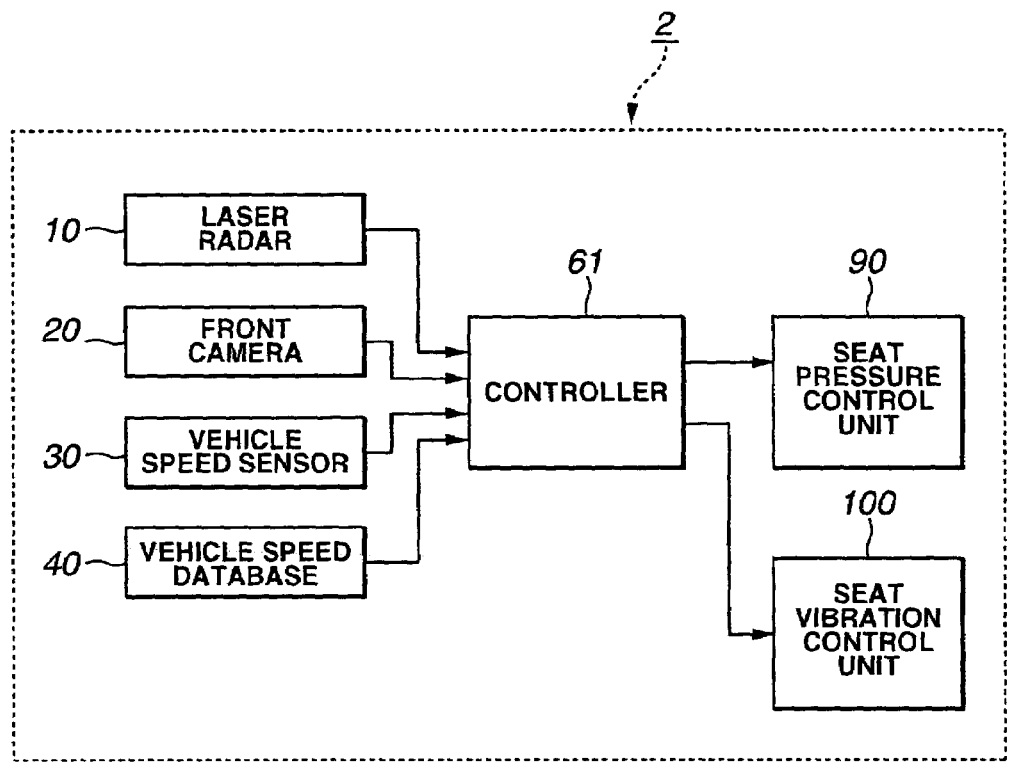
FIG. 28 is a block diagram illustrating hardware of a fifth exemplary implementation of a driver assisting system according to the present invention.

At step S421, the controller 60 may determine the correction coefficient k3* based on the accelerator pedal position Sp using the illustrated relationship in FIG. 27. The fully drawn line in FIG. 27 illustrates an exemplary varying of the correction coefficient k3* with different values of the accelerator pedal position Sp. As indicated by the fully drawn line in FIG. 27, the correction coefficient k3* gradually increases from 0 (zero) to 1 as the accelerator pedal position Sp increases when the accelerator pedal position Sp is less than a predetermined value Sp2. When the accelerator pedal position Sp is equal to or greater than the predetermined value Sp2, the correction coefficient k3* is fixed to 1.

In addition to the effects provided by the first, second, and third exemplary implementations, the above-mentioned fourth exemplary implementation provides further effects as follows:

(1) The vehicle driver is kept informed of how much the vehicle speed Vf exceeds the vehicle speed standard Vt without feeling an objection to receiving click reaction forces Fc because the controller 60 alters the click interval and the magnitude of a click reaction force based on the results of calculation of the excess, in state or in amount, by which the vehicle speed Vf exceeds the vehicle speed standard Vt. Further, the frequency of occurrence of click reaction forces Fc becomes lower as the time elapsed $T_{\_over}$ becomes longer, keeping the driver informed of the excess by which the vehicle speed Vf exceeds the vehicle speed standard Vt without feeling an objection to receiving the click reaction forces Fc.

(2) The driver is prevented from feeling an objection to receiving click reaction forces Fc because the controller 60 alters the magnitude of click reaction forces Fc based on the accelerator pedal position Sp. Concretely, the magnitude of click reaction forces Fc is held 0 (zero) or small when the accelerator pedal position Sp is small.

Fifth Exemplary Implementation of the Invention

With continuing reference to FIG. 2, the illustrated vehicle may be installed with a fifth exemplary implementation of a driver assisting system 2 according to the present invention. Referring to FIGS. 28 to 31, FIG. 28 is a block diagram showing elements constituting the driver assisting system 2, and FIGS. 29 to 31 illustrate a driver's seat for the vehicle illustrated in FIG. 2.

The fifth exemplary implementation is substantially the same as the first exemplary implementation in that there are a laser radar 10, a front camera 20, a vehicle speed sensor 30, and a vehicle speed database 40. However, instead of the accelerator pedal reaction force control unit 80, the driver assisting system 2 uses a seat pressure control unit 90 and a seat vibration control unit 100. The seat pressure control unit 90 performs regulation of pressure within an air bag embedded in the driver's seat. The seat vibration control unit 100 controls vibration generated at the driver's seat.

In the fifth exemplary implementation, the hardness and elevation (or height) of the driver's seat are adjustable by regulating pressure within the air bag in dependence on a risk perceived RP by the vehicle driver from environment around the vehicle. In the fifth exemplary implementation, vibration of the driver's seat keeps the vehicle driver informed of how the vehicle speed Vf exceeds the vehicle speed standard Vt. Further, altering interval and/or magnitude of vibration provides the driver with information on the relationship with the vehicle speed standard Vt.

Referring to FIGS. 29-30, one example of the driver's seat is generally indicated by the reference numeral 110. FIG. 29 is a perspective view of the driver's seat 110, which is controlled by the seat pressure control unit 90 and the seat vibration control unit 100. The driver's seat 110 includes a headrest 111, a seat back 112, and a seat cushion 113. FIG. 30 is a cross section of the seat cushion 113 taken through the line 30-30 in FIG. 29 in an uninflated state. FIG. 31 is the same cross section of the seat cushion 113 in an inflated state. At a front edge portion, the cushion portion 113 has embedded therein an air bag 91 and a plurality of vibrators 101. The air bag 91 is under the control of the seat pressure control unit 90. The vibrators 101 are under the control of the seat vibration control unit 100. As shown in FIG. 31, when the air bag 91 is inflated, the surface of the seat cushion 113 is expanded and stretched, allowing the vehicle driver to feel a change in pressure within the air bag 91 through the femoral region.

Figure 32:
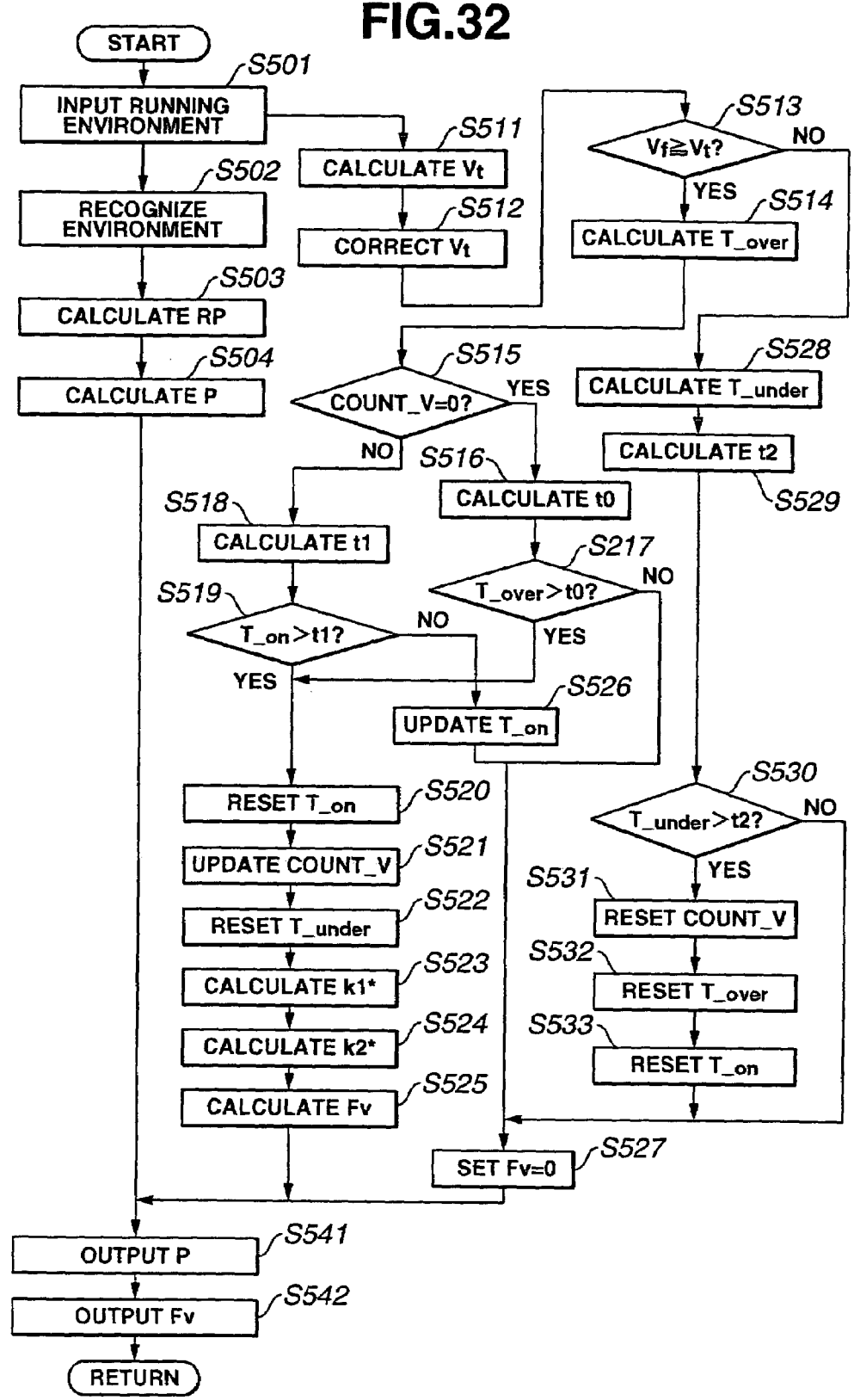
FIG. 32 is a flow chart illustrating operation of the fifth exemplary implementation.

Referring to FIG. 32 and FIGS. 33(a) to 33(c), the following provides description on operation of the fifth exemplary implementation of driver assisting system 2. FIG. 32 illustrates a flow chart of a driver assisting control program executed by a controller 61 used in the fifth exemplary implementation of the present invention. FIGS. 33(a) to 33(c) are time charts illustrating time variations of vehicle speed Vf, seat vibration, and seat pressure. The execution of the program illustrated in FIG. 6 is repeated at regular intervals, for example, every 50 msec.

In FIG. 32, at step S501, the controller 61 performs a reading operation of output signals from the accelerator pedal stroke sensor 83, vehicle speed sensor 30, laser radar 10, and front camera 20 to obtain information on the running environment around the vehicle. At step S502, the controller 61 performs analysis of the obtained information to recognize the state of the environment around the vehicle by calculating a distance D to a preceding vehicle and a relative speed Vr to the preceding vehicle. The relative speed Vr is given by subtracting a vehicle speed Vf of the vehicle operated by a driver from a vehicle speed Vp of the preceding vehicle (Vr=Vp−Vf).

After step S502, the logic moves to steps S503 and S504. At step S503, the controller 61 calculates a risk perceived RP. At step S204, the controller 61 calculates a seat pressure P based on the risk perceived RP. The seat pressure P is a pressure to build up within the air bag 91 embedded in the driver's seat 110. In the fifth exemplary implementation, the seat pressure P is proportional to the risk perceived RP.

Because steps S511, S512, S513, and S514 correspond to steps S211, S212, S213, and S214 of the flow chart illustrated in FIG. 6, further description on what the controller 61 performs at steps S511, S512, S513, and S514 is hereby omitted for brevity. At step S515, the controller 61 determines whether or not the content of a vibration frequency counter COUNT_V is equal to 0 (zero).

Determining, at step S515, that the content of the vibration frequency counter COUNT_V is zero (COUNT_V=0) means that no driver's seat vibration has occurred since the vehicle speed Vf became equal to or greater than the vehicle speed standard Vt. If this is the case, the logic proceeds to step S516. At step S516, the controller 61 determines a vibration starting period t0. In this fifth exemplary implementation, the controller 61 determines the vibration starting period to based on an excess $\Delta V$ by which the vehicle speed Vf exceeds the vehicle speed standard Vt ($\Delta V = Vf - Vt$) using the illustrated relationship in FIG. 9.

At step S517, the controller 61 determines whether or not a time elapsed $T_{\_over}$, which is a time elapsed from a moment immediately after the vehicle speed Vf became equal to or greater than the vehicle speed standard Vt, has exceeded the vibration starting period to. If, at step S517, the time elapsed $T_{\_over}$ has exceeded the vibration starting period to, the logic goes to step S520.

Determining, at step S515, that the content of the vibration frequency counter COUNT_V is equal to or greater than 1 (COUNT_V≠0) means that driver's seat vibration has occurred since the vehicle speed Vf became equal to or greater than the vehicle speed standard Vt. If this is the case, the logic proceeds to step S518. At step S518, the controller 61 determines a vibration interval t1 between the adjacent two vibrations. In this fifth exemplary implementation, the controller 61 determines the vibration interval t1 based on an excess $\Delta V$, by which the vehicle speed Vf exceeds the vehicle speed standard Vt using the illustrated relationship in FIG. 10. In FIG. 10, the fully drawn line illustrates an exemplary varying of the vibration interval t1 with different values of the excess $\Delta V$.

At step S519, the controller 61 determines whether or not a vibration time $T_{\_on}$, which is a time elapsed from a moment immediately after occurrence of vibration, has exceeded the vibration interval t1 determined at step S518. If, at step S519, the vibration time $T_{\_on}$ has exceeded the vibration interval t1 ($T_{\_on} > t1$), the logic goes to step S520 and onwards for generating vibration of the driver's seat 110.

At step S520, the controller 61 resets the vibration time $T_{\_on}$. At the next step S521, the controller 61 updates the vibration frequency counter COUNT_V. Subsequently, at step S522, the controller resets a time elapsed $T_{\_under}$ from a moment immediately after the vehicle speed Vf became less than the vehicle speed standard Vt.

At step S523, the controller 61 determines a first correction coefficient k1 based on the excess $\Delta V$ using the illustrated relationship in FIG. 11. The first correction coefficient k1 is used to calculate amplitude Fv of vibration.

At step S524, the controller 61 determines a second correction coefficient k2 based on the risk perceived RP calculated at step S503 using the illustrated relationship in FIG. 12. The second correction coefficient k2 is used to calculate the amplitude Fv of vibration.

At step S525, using the first and second correction coefficients k1 and k2, the controller 61 calculates the amplitude Fv, which is expressed as:

$$Fv = k1 \cdot k2 \cdot Fvr \quad \text{(Eq. 10)}$$

where: Fvr represents a standard value of the amplitude of vibration.

If, at step S519, the vibration time $T_{\_on}$ is equal to or less than the vibration interval t1, the logic proceeds to step S526. At step S526, the controller 61 carries out updating by increasing the vibration time $T_{\_on}$ by an unit amount of time, and the logic goes to step S527. The logic also proceeds to step S527 from step S517 if, at step S517, the time elapsed $T_{\_over}$ is equal to or less than the vibration starting period t0. At step S527, the controller 61 sets the amplitude Fv equal to 0 (Fv=0) to prevent occurrence of vibration.

After setting the amplitude Fv at step S525 or S527, the logic moves to step S541. At step S541, the controller 61 provides, as an output, the seat pressure P calculated at step S504 to the seat pressure control unit 90. At the next step S542, the controller 61 provides, as an output, the amplitude Fv calculated at step S525 or 527 to the seat vibration control unit 100. In response to the output provided by the controller 61, the seat pressure control unit 90 inflates the air bag 91 to accomplish the seat pressure P. In response to the output provided by the controller 61, the seat vibration control unit 100 causes the vibrators 101 to accomplish the amplitude Fv.

If, at step S513, the vehicle speed Vf is less than the vehicle speed standard Vt, the logic continues to step S528. At step S528, the controller 61 calculates a time elapsed $T_{\_under}$ from a moment immediately after the vehicle speed Vf became less than the vehicle speed standard Vt. At step S529, the controller 61 determines a reset period t2 based on the time elapsed $T_{\_over}$ using the illustrated relationship in FIG. 14A or 14B.

At the next step S530, the controller 61 determines whether or not the time elapsed $T_{\_under}$ has exceeded the reset period t2 that was determined at step S529. If, at step S530, the time elapsed $T_{\_under}$ has exceeded the reset period t2, the logic moves to step S531. At step S531, the controller 61 resets the vibration frequency counter COUNT_V. At the next step S532, the controller 61 resets the time elapsed $T_{\_over}$. At the next step S533, the controller 61 resets the vibration time $T_{\_on}$. Then, the logic proceeds to step S527. At step S527, the controller 61 sets the amplitude Fv equal to 0 (Fv=0).

If, at step S530, the time elapsed $T_{\_under}$ is less than the reset period t2, the logic proceeds directly to step S527 without resetting the click frequency counter COUNT_V (step S531), the time elapsed $T_{\_over}$ (step S532), and the vibration time $T_{\_on}$ (step S533). At step S527, the controller 61 sets the amplitude Fv equal to 0 (Fv=0).

FIGS. 33(a)-33(c) illustrate how the fifth exemplary implementation of the driver assisting system 2 operates. As illustrated in FIGS. 33(a)-33(c), vibration occurs upon expiration of the vibration starting period t0 that varies in response to the excess ΔV after the vehicle speed Vf became greater than or equal to the vehicle speed standard Vt. Subsequently, the vibration occurs at the vibration interval t1 that varies in response to the excess ΔV when the vehicle speed Vf remains greater than or equal to the vehicle speed standard Vt. The amplitude Fv is determined in response to the excess ΔV and the risk perceived RP. Thus, the amplitude Fv of vibration increases in response to an increase in the excess ΔV and/or an increase in the risk perceived RP.

The driver's seat 110 provides varying seat pressure P with the calculated risk perceived RP and vibration indicative of information on the vehicle speed standard Vt. With this driver's seat 110, the vehicle driver is kept informed of varying of the calculated risk perceived RP via continuous variations of the seat pressure P and also of the information on the vehicle speed standard Vt via interrupted vibration of the driver's seat 110. Amplitude Fv of vibration may be altered to keep the driver informed of varying of the excess ΔV or varying of the magnitude of the calculated risk perceived RP. The frequency of vibration becomes higher when the vehicle speed Vf continues to stay longer above the vehicle speed standard Vt, amplifying effectiveness in prompting the driver to pay attention to the increased potential risk.

The amount of potential risk, which was forwarded to the driver, is immediately forwarded to the driver when the vehicle speed Vf exceeds the vehicle speed standard Vt again unless time during which the vehicle speed Vf stays temporarily below the vehicle speed standard Vt exceeds the reset period t2 because the amplitude Fv and interval of vibration existing before the vehicle speed Vt dropped below the vehicle speed standard Vt are held for the reset period t2. Thus, forwarding the amount of potential risk to the driver resumes immediately after the vehicle speed Vf has exceeded the vehicle speed standard Vt again unless the time during which the vehicle speed Vf stayed below the preset period exceeds the reset period t2.

In the previous description, the relationship illustrated in FIG. 10 was used for the controller 61 to calculate the interval t1 of vibration, and the relationship illustrated in FIG. 11 was used for the controller 61 to calculate the correction coefficient k1. Instead of using the relationship illustrated in FIG. 10, the controller 61 may use the relationship illustrated in FIG. 15A or 15B to calculate the interval t1. Instead of using the relationship illustrated in FIG. 11, the controller 61 may use the relationship illustrated in FIGS. 16A and 16B.

In the previous description, the driver's seat 110 (see FIGS. 29 to 31) was equipped with the air bag 91 and vibrators 101 to generate pressure and vibration applied to the driver. Instead of the air bag 91 and vibrators 101, a lifter mechanism for adjusting the height of a front edge portion of a cushion 113 of a driver's seat may be used. The lifter mechanism may be used to lift the front edge portion of the cushion 113 for the driver's seat to generate increased seat pressure P. It may be used to repeat vertical up and down movement of the front edge portion of the cushion 113 once or more for the driver's seat to generate vibration. This fifth exemplary implementation may be modified to cause the driver's seat to generate the seat pressure and vibration under the same conditions as those used in the third or fourth exemplary implementation.

In addition to the effects provided by the first to fourth exemplary implementations, the above-mentioned fifth exemplary implementation provides further effects as follows:

The controller 61 translates a change in the risk perceived RP from an obstacle into a continuous change in seat pressure of the driver's seat 110, that is, a change in height and hardness, and information relating to the vehicle speed standard Vt into vibration generated by the driver's seat 110 to be forwarded to the driver. Thus, the driver is kept informed of a plurality of risks around the vehicle by perceiving different forms of tactile stimulus from the driver's seat. Altering the interval or amplitude of vibration generated by the driver's seat 110 in response to the amount or level of excess by which the vehicle speed Vf exceeds the vehicle speed standard Vt makes it possible to forward the amount or level of the excess to the driver.

Sixth Exemplary Implementation of the Invention

With continuing reference to FIG. 2, the illustrated vehicle may be installed with a sixth exemplary implementation of a driver's assisting system according to the present invention. This sixth exemplary implementation is substantially the same as any one of the previously described second to fourth exemplary implementation. However, the sixth exemplary implementation is different from the previously described exemplary implementation in that, instead of the accelerator pedal reaction force control unit 80 and servo motor 81, a steering system is equipped with a driver mechanism to move a steering wheel back and forth.

In the sixth exemplary implementation, the driver mechanism moves the steering wheel toward or away from a driver in response to a change in risk perceived RP from the environments around the vehicle. The driver mechanism moves the steering wheel back and forth once within a short stroke or repeats such short stroke back-and-forth movement when the vehicle speed Vf exceeds the vehicle speed standard Vt.

FIGS. 34 and 35 illustrate a portion of the steering system equipped with the driver mechanism. As usual, the steering system includes a steering wheel 120 and a steering column 121. The steering system is equipped with a motor unit 122 of the driver mechanism. As the risk perceived RP from environments around the vehicle grows bigger, the motor unit 122 extends the steering column 121 to move the steering wheel 120 toward the driver. When the vehicle speed Vf exceeds the vehicle speed standard Vt, the motor unit 122 carries out a short stroke back-and-forth movement of the steering wheel 120 or repeats the short stroke back-and-forth movement. Altering the interval and/or stroke of the short stroke back-and-forth movement makes it possible to forward information relative to the vehicle speed standard Vt to the driver. This sixth exemplary implementation may be modified to cause the back and forth movement of the steering wheel 120 under the same conditions as those used in the second or third or fourth exemplary implementations.

In addition to the effects provided by the first to fifth exemplary implementations, the above-mentioned fifth exemplary implementation provides further effects as follows:

As a change in risk perceived RP from an obstacle is translated into extension and retraction of the steering column 121, the risk perceived RP is forwarded to the driver by a continuous change in position of the steering wheel 120. Information that the vehicle speed Vf exceeds the vehicle speed standard Vt is forwarded to the driver by a short stroke back-and-forth movement of the steering column 121. Altering the interval or stroke of the short stroke back-and-forth movement of the steering column 121 in response to the amount or level of excess by which the vehicle speed Vf exceeds the vehicle speed standard Vt makes it possible to forward the amount or level of the excess to the driver.

In the preceding description of the first to sixth exemplary implementations, a time to collision TTC and a time headway THW were used to give a risk perceived RP using the equation Eq. 3. This is just an example of calculation to give the risk perceived RP. Another example uses the reciprocal of time to collision TTC to give the risk perceived RP. In the preceding description, the reaction force increment dF was proportional to the risk perceived RP. This is just an example of giving the reaction force increment dF. Another example is setting the reaction force increment dF such that it increases exponentially as the risk perceived RP grows bigger.

In the preceding description, the second exemplary implementation was operable on the vehicle speed standard Vt, click starting period t0, click interval t1, click reaction force Fc, and reset period t2, all of which were variable. The second exemplary implementation, however, may be operable as long as at least one of the vehicle speed standard Vt, click starting period t0, click interval t1, click reaction force Fc, and reset period t2 is variable. Referring back to Eq. 7, all of three correction coefficients k1, k2, and k3 were calculated to give the magnitude of a click reaction force Fc. The second exemplary implementation, however, may be operable as long as at least one of these correction coefficients is calculated.

In the first to sixth embodiments, the laser radar 10, front camera 20, vehicle speed sensor 30, vehicle speed information database 40, and controller 60 or 61 cooperate with each other to input or obtain a running environment around the vehicle. The laser radar 10, front camera 20, and vehicle speed sensor 30 cooperate with each other to detect an obstacle. The vehicle speed information database 40 and controller 60 or 61 cooperate with each other to calculate a vehicle speed standard Vt. The controller 60 or 61 is operative to calculate a risk perceived RP and also to regulate tactile stimulus to be forwarded to a driver. The accelerator pedal reaction force control unit 80, seat pressure control unit 90, vibration control unit 100, and motor unit 122 are used to forward the tactile stimulus to the driver. The accelerator pedal reaction force control unit 80 is operative to generate accelerator pedal reaction force. The seat pressure control unit 90 and seat vibration control unit 100 are operative to control the seat. The motor unit 122 is operative to control extension and retraction of the steering column. The hardware is not limited to them listed above in constituting the present invention. For example, the laser radar 10 might be replaced by a different type of millimeter wave radar to detect the obstacle.

In certain embodiments of the invention, the driver contact surfaces are those surfaces within the vehicle which the driver is expected to have substantially continuous contact to provide the driver with the best haptic channel information. For example, such a contact includes the driver's seat, the steering wheel, the accelerator pedal, etc. The invention is not limited to such surfaces, however, and can also be employed with other driver controlled input devices or surfaces, such as an armrest or turn signal lever, for example. Also, although the invention has been primarily described with the example of tactile stimulus, the invention is not limited to tactile stimuli, but other types of stimulus can be used to stimulate the driver.

Although the invention has been shown and described with respect to certain exemplary implementations, it is obvious that equivalent alterations and modifications will occur to others skilled in the art upon reading and understanding of the specification. The present invention includes all such equivalent alterations and modifications, and is limited only by the scope of the claims.

The present application claims the priority based on Japanese Patent

Application No. 2003-391124, filed Nov. 20, 2003, the disclosure of which is hereby incorporated by reference in its entirety.

What is claimed is:

1. A driver assisting system for assisting a driver, within a driver's seat of a vehicle, operating a driver controlled input device of the vehicle, comprising:

a running environment detecting device configured to detect an obstacle appearing in a running environment around the vehicle and obtain information of a legal speed restriction for a road on which the vehicle is traveling;

a vehicle speed sensor configured to detect a vehicle speed of the vehicle;

a risk calculating section configured to calculate a first type of risk perceived by the driver associated with a possible collision with the detected obstacle and a second type of risk unrelated to the detected obstacle and derived based on the detected vehicle speed and the legal speed restriction;

a tactile stimulus controlling section configured to translate the calculated first type of risk and second type of risk into different first and second forms of tactile stimulus, respectively; and a tactile stimulus forwarding device configured to forward the calculated first and second type of risk to the driver by applying the first and second forms of tactile stimulus to the driver, via a single device, wherein the single device is the driver's seat or the driver controlled input device.

2. The driver assisting system as recited in claim 1, wherein the tactile stimulus controlling section controls the tactile stimulus forwarding device such that the calculated first type of risk is forwarded to the driver by applying the first form of tactile stimulus to the driver in a continuous manner, and the calculated second type of risk is forwarded to the driver by applying the second form of tactile stimulus to the driver in an intermittent, non-continuous or pulsed manner.

3. The driver assisting system as recited in claim 2, wherein the second type of risk indicates a state that the vehicle speed exceeds the legal speed restriction and wherein the tactile stimulus controlling section controls the tactile stimulus forwarding device such that the driver is stimulated with the second form of tactile stimulus that occurs with a predetermined magnitude at a predetermined interval when the vehicle speed exceeds the legal speed restriction.

4. The driver assisting system as recited in claim 2, wherein the second type of risk represents a status and an amount of an excess by which the vehicle speed exceeds the legal speed restriction, and wherein the tactile stimulus controlling section alters the form in which the second form of tactile stimulus occurs according to different values of the excess.

5. The driver assisting system as recited in claim 4, wherein the tactile stimulus controlling section varies an interval and a magnitude with which the second form of tactile stimulus occurs with different values of the excess.

6. The driver assisting system as recited in claim 4, wherein the tactile stimulus controlling section varies a magnitude with which the second form of tactile stimulus occurs with different values of the calculated second type of risk.

7. The driver assisting system as recited in claim 4, wherein the tactile stimulus controlling section varies a magnitude with which the second form of tactile stimulus occurs with different values of an accelerator pedal position.

8. The driver assisting system as recited in claim 4, wherein the tactile stimulus controlling section varies a frequency with which the second form of tactile stimulus occurs with different values of the excess.

9. The driver assisting system as recited in claim 2,
wherein the one of the driver's seat and the driver controlled input device is an accelerator pedal;
wherein the tactile stimulus forwarding device includes an accelerator pedal reaction force control unit;
wherein the tactile stimulus controlling section causes the accelerator pedal reaction force control unit to provide, as the first force, an accelerator pedal reaction force that continuously varies with different values of the calculated first type of risk; and
wherein the tactile stimulus controlling section causes the accelerator pedal reaction force control unit to provide, as the second force, a pulse-like reaction force added to the accelerator pedal reaction force in response to the calculated second type of risk.

10. The driver assisting system as recited in claim 2,
wherein the one of the driver's seat and the driver controlled input device is the driver's seat;
wherein the tactile stimulus forwarding device includes a seat control unit;
wherein the tactile stimulus controlling section causes the seat control unit to provide, as the first force, a force that continuously vary the driver's seat in height and hardness with different values of the calculated first type of risk, and
wherein the tactile stimulus controlling section causes the seat control unit to provide, as the second force, a vibration of the driver's seat in response to the calculated second type of risk.

11. The driver assisting system as recited in claim 2,
wherein the one of the driver's seat and the driver controlled input device is a steering system including a steering column; and
wherein the tactile stimulus forwarding device includes a motor unit that retractably extends the steering column.

12. A vehicle having a driver contact surface, comprising:
a running environment detecting section configured to detect an obstacle in a running environment around the vehicle and information of a legal speed restriction for a road on which the vehicle is traveling;
a vehicle speed sensor configured to detect a vehicle speed with which the vehicle is traveling;
a risk calculating section configured to calculate a first risk perceived by the driver associated with a possible collision with the detected obstacle and a second type of risk unrelated to the detected obstacle and derived based on the detected vehicle speed and the legal speed restriction;
a stimulus controlling section configured to translate the calculated first type of risk and the second type of risk into different first and second forms of tactile stimulus, respectively; and
a risk forwarding device configured to forward the calculated first and second type of risk to the driver by applying the first and second forms of tactile stimulus to the driver via the driver contact surface.

13. The vehicle as recited in claim 12, wherein the first type of risk is a tangible risk to be perceived by the driver and the second type of risk is a potential risk.

14. The vehicle as recited in claim 13, wherein the risk forwarding device includes at least one actuator, and the driver contact surface is at least one of a driver's seat and a driver controlled input device coupled to the actuator, such that the actuator provides a first force to the driver contact surface to stimulate the driver with the first form of tactile stimulus thereby to forward the tangible risk to the driver, and a second force to the driver contact surface to stimulate the driver with the second form of tactile stimulus thereby to forward the potential risk to the driver.

15. The vehicle as recited in claim 14, wherein the potential risk is indicative of an excess by which the detected vehicle speed of the vehicle exceeds the legal speed restriction.

16. The vehicle as recited in claim 15, wherein the first form of tactile stimulus occurs continuously when the tangible risk is present, and the second form of tactile stimulus occurs in an intermittent, non-continuous or pulsed manner when the potential risk is present.

17. The vehicle as recited in claim 16, wherein the first form of tactile stimulus is continuously variable with different values of the tangible risk, and the second form of tactile stimulus provides repeating a discrete stimulus at interval when varying of the excess with respect to time justifies continuation of repeating the discrete stimulus.

18. The vehicle as recited in claim 17, wherein the interval at which the discrete stimulus is repeated is variable.

19. The vehicle as recited in claim 18, wherein the interval at which the discrete stimulus is repeated is variable with different values of at least one of the excess by which the vehicle speed exceeds the legal speed restriction and a time elapsed from a moment immediately after the vehicle speed has exceeded the legal speed restriction.

20. The vehicle as recited in claim 17, wherein a magnitude of discrete stimulus is variable with different values of at least one of the excess by which the vehicle speed exceeds the legal speed restriction, the tangible risk, an accelerator pedal position of an accelerator pedal of the vehicle, and a time elapsed from a moment immediately after the vehicle speed has exceeded the legal speed restriction.

21. The vehicle as recited in claim 16, wherein the number of times the discrete stimulus is repeated within a predetermined span of time is variable with different ranges of values of the excess by which the vehicle speed exceeds the legal speed restriction.

22. The vehicle as recited in claim 12, where the first type of risk is a collision risk derived from the detected obstacle and the second type of risk is a vehicle driving risk.

23. The vehicle as recited in claim 12, wherein the first type of risk is a collision risk derived from the detected obstacle and the second type of risk is a potential risk.

24. The vehicle as recited in claim 12, wherein the first type of risk is a current risk derived from the detected obstacle and the second type of risk is a future risk indicative of likelihood that the vehicle might cause a traffic accident.

25. A method for assisting a driver, within a driver's seat of a vehicle, operating a driver controlled input device of the vehicle, comprising:
  detecting an obstacle in a running environment around the vehicle;
  obtaining information of a legal speed restriction for a road on which the vehicle is traveling;
  detecting a vehicle speed with which the vehicle is traveling;
  calculating a first type of risk perceived by the driver associated with a possible collision with the detected obstacle;
  calculating a second type of risk unrelated to the detected obstacle and derived based on the detected vehicle speed and the legal speed restriction;
  translating the calculated first type of risk and the second type of risk into different first and second forms of tactile stimulus, respectively; and
  forwarding the calculated first and second type of risk to the driver by applying the first and second form of tactile stimulus to the driver via a single device, wherein the single device is the driver's seat or the driver controlled input device.

26. A driver assisting system for assisting a driver, within a driver's seat of a vehicle, operating a driver controlled input device of the vehicle, comprising:
  means for detecting an obstacle in a running environment around the vehicle;
  means for obtaining information of a legal speed restriction for a road on which the vehicle is traveling;
  means for detecting a vehicle speed with which the vehicle is traveling;
  means for calculating a first type of risk perceived by the driver associated with a possible collision with the detected obstacle;
  means for calculating a second type of risk unrelated to the detected obstacle and derived based on the detected vehicle speed and the legal speed restriction;
  means for translating the calculated first risk and second risk into different first and second forms of tactile stimulus, respectively; and
  means for forwarding the calculated first and second type of risk to the driver by applying the first and second form of tactile stimulus to the driver via a single device, wherein the single device is the driver's seat or a driver controlled input device.

27. A driver assisting system for assisting a driver operating a vehicle having a driver contact surface, comprising:
  a running environment detecting section configured to detect an obstacle in a running environment around the vehicle and information of a legal speed restriction for a road on which the vehicle is traveling;
  a vehicle speed sensor configured to detect a vehicle speed with which the vehicle is traveling;
  a risk calculating section configured to calculate a first type of risk perceived by the driver associated with a possible collision with the detected obstacle and a second type of risk unrelated to the detected obstacle and derived based on the detected vehicle speed and the legal speed restriction;
  a stimulus controlling section configured to translate the calculated first risk and second risk into different first and second forms of stimulus, respectively; and
  a risk forwarding device configured to forward the calculated first and second type of risk to the driver by applying the first and second forms of tactile stimulus to the driver via the driver contact surface.

28. The driver assisting system as recited in claim 27, wherein the driver contact surface to which the first form of tactile stimulus and the second form of tactile stimulus are provided is a driver's seat.

29. The driver assisting system as recited in claim 27, wherein the driver contact surface to which the first form of tactile stimulus and the second form of tactile stimulus are provided is a driver controlled input device.

30. The driver assisting system as recited in claim 27, wherein at least one of the first and second forms of stimulus is a tactile stimulus.

31. The driver assisting system as recited in claim 30, wherein the tactile stimulus is a continuous contact stimulus.

32. The driver assisting system as recited in claim 27, wherein at least one of the first and second forms of stimulus is a non-tactile stimulus.

33. A method for assisting a driver, within a driver's seat of a vehicle, operating a driver controlled input device of the vehicle, comprising;
  detecting an obstacle;
  obtaining information of a legal speed restriction on vehicle speeds for a road which the vehicle is traveling on;
  detecting a vehicle speed with which the vehicle is traveling;

calculating a first type risk perceived by the driver from the detected obstacle; calculating a second type of risk by comparing the detected vehicle speed and the legal speed restriction;

translating the calculated first and second type of risk into different first and second forms of tactile stimulus, respectively; and forwarding the calculated first and second type of risk to the driver by applying the first and second forms of tactile stimulus to the driver via a single device, wherein the single device is the driver's seat or the driver controlled device.

34. The method as recited in claim 33, wherein the first type of risk is a collision risk derived from the detected obstacle and the second type of risk is a vehicle driving risk.

35. The method as recited in claim 33, wherein the first type of risk is a collision risk derived from the detected obstacle and the second type of risk is a potential risk.

36. The method as recited in claim 33, wherein the first type of risk is a current risk derived from the detected obstacle and the second type of risk is a future risk indicative of likelihood that the vehicle might cause a traffic accident.

* * * * *